US009764630B2

(12) United States Patent
Kaltenbach et al.

(10) Patent No.: US 9,764,630 B2
(45) Date of Patent: Sep. 19, 2017

(54) HYBRID DRIVE OF A MOTOR VEHICLE

(71) Applicant: ZF Friedrichshafen AG, Friedrichshafen (DE)

(72) Inventors: Johannes Kaltenbach, Friedrichshafen (DE); Michael Roske, Friedrichshafen (DE); Uwe Griesmeier, Markdorf (DE)

(73) Assignee: ZF Frierichshafen AG, Friedrichshafen (DE)

( * ) Notice: Subject to any disclaimer, the term of this patent is extended or adjusted under 35 U.S.C. 154(b) by 0 days.

(21) Appl. No.: 14/909,287

(22) PCT Filed: Jun. 30, 2014

(86) PCT No.: PCT/EP2014/063794
§ 371 (c)(1),
(2) Date: Feb. 1, 2016

(87) PCT Pub. No.: WO2015/014555
PCT Pub. Date: Feb. 5, 2015

(65) Prior Publication Data
US 2016/0176280 A1    Jun. 23, 2016

(30) Foreign Application Priority Data
Aug. 1, 2013   (DE) .................. 10 2013 215 114

(51) Int. Cl.
*B60K 6/48* (2007.10)
*F16H 3/089* (2006.01)
(Continued)

(52) U.S. Cl.
CPC ............. *B60K 6/365* (2013.01); *B60K 6/387* (2013.01); *B60K 6/40* (2013.01); *B60K 6/48* (2013.01);
(Continued)

(58) Field of Classification Search
CPC .......... B60K 6/365; B60K 6/387; B60K 6/48; B60K 6/547; B60K 6/40; B60W 10/11;
(Continued)

(56) References Cited

U.S. PATENT DOCUMENTS 5,839,533 A    11/1998   Mikami et al.
6,645,105 B2   11/2003   Kima
(Continued)

FOREIGN PATENT DOCUMENTS

DE           19934696 A1    5/2001
DE           10152477 A1    5/2003
(Continued)

OTHER PUBLICATIONS

PCT International Search Report and Written Opinion, dated Sep. 8, 2014.
German Search Report, dated May 13, 2014.

*Primary Examiner* — Ramya Burgess
*Assistant Examiner* — Lillian Nguyen
(74) *Attorney, Agent, or Firm* — Dority & Manning, P.A.

(57) ABSTRACT

A hybrid drive of a motor vehicle has an internal combustion engine, an electric machine, an automated manual transmission with an input shaft and an output shaft, and a phase shifter gearbox in a planetary design with two input elements and one output element. A first input element of the gearbox is connected to a hollow shaft arranged in a coaxial manner around the output shaft, which is connectable to an idler gear of an axially adjacent spur gear stage of the manual transmission, and, for bypassing the gearbox, is connectable to the second input element or the output element of the gearbox. The second input element of the gearbox is permanently in drive connection with a rotor of the electric machine, and the output element of the gearbox is connected in a torque-proof manner to the output shaft.

18 Claims, 13 Drawing Sheets

(51) Int. Cl.
     *B60K 6/365*  (2007.10)
     *B60K 6/40*   (2007.10)
     *B60K 6/547*  (2007.10)
     *F16H 3/091*  (2006.01)
     *F16H 3/093*  (2006.01)
     *F16H 3/72*   (2006.01)
     *B60W 20/40*  (2016.01)
     *B60K 6/387*  (2007.10)

(52) U.S. Cl.
     CPC .............. *B60K 6/547* (2013.01); *B60W 20/40* (2013.01); *F16H 3/093* (2013.01); *F16H 3/0915* (2013.01); *F16H 3/725* (2013.01); B60K 2006/4808 (2013.01); B60Y 2200/92 (2013.01); F16H 2003/0931 (2013.01); F16H 2200/0043 (2013.01); Y10S 903/911 (2013.01); Y10S 903/914 (2013.01); Y10S 903/951 (2013.01)

(58) Field of Classification Search
     CPC ...... B60W 20/40; F16H 3/0915; F16H 3/093; F16H 3/725; F16H 2200/0043
     See application file for complete search history.

(56) References Cited

U.S. PATENT DOCUMENTS

| | | |
|---|---|---|
| 6,805,648 B1 | 10/2004 | Ehrlinger |
| 7,785,221 B2 | 8/2010 | Steinwender |
| 8,075,436 B2 | 12/2011 | Bachmann |
| 8,696,506 B2 | 4/2014 | Kaltenbach et al. |
| 8,961,345 B2* | 2/2015 | Kaltenbach ............ F16H 3/126 475/5 |
| 2007/0087884 A1 | 4/2007 | Janssen |
| 2007/0259748 A1 | 11/2007 | Forsyth |
| 2010/0009805 A1* | 1/2010 | Bachmann ............ B60K 6/365 477/5 |
| 2012/0035013 A1* | 2/2012 | Appeltauer ............ B60K 6/365 475/1 |
| 2012/0240723 A1* | 9/2012 | Gluckler ................. B60K 6/36 74/661 |
| 2013/0267367 A1* | 10/2013 | Kaltenbach ............ B60K 6/365 475/5 |
| 2014/0150604 A1 | 6/2014 | Kaltenbach |

FOREIGN PATENT DOCUMENTS

| | | |
|---|---|---|
| DE | 102004005349 A1 | 8/2005 |
| DE | 102006027709 A1 | 12/2007 |
| DE | 102006059591 A1 | 6/2008 |
| DE | 102007042949 A1 | 4/2009 |
| DE | 102010030567 A1 | 12/2011 |
| DE | 102010043354 A1 | 5/2012 |
| DE | 102011005562 A1 | 9/2012 |
| DE | 102011080069 A1 | 1/2013 |
| DE | 102011085201 A1 | 5/2013 |
| DE | 102011086327 A1 | 5/2013 |
| WO | WO 2012/123172 A1 | 9/2012 |

* cited by examiner

| Operating Mode | VM | S1 | S2 | S3 | S4 | EM |
|---|---|---|---|---|---|---|
| EDA - Mode | G2 | --- | --- | K | --- | --- |
| E-Driving | --- | --- | --- | --- | L | E1 |
| E-Driving | --- | --- | --- | --- | M | E2 |
| V-Driving | G1 | A | --- | --- | --- | --- |
| V-Driving | G2 | --- | B | --- | --- | --- |
| V-Driving | G3 | C | --- | --- | --- | --- |
| V-Driving | G4 | --- | D | --- | --- | --- |
| V+E-Driving | G1 | A | --- | --- | L | E1 |
| V+E-Driving | G2 | --- | B | --- | L | E1 |
| V+E-Driving | G3 | C | --- | --- | M | E2 |
| V+E-Driving | G4 | --- | D | --- | M | E2 |

Fig.1a

| Operating Mode | VM | S1 | S2' | S4 | EM |
|---|---|---|---|---|---|
| EDA-Mode | G2 | --- | K | --- | --- |
| E-Driving | --- | --- | --- | L | E1 |
| E-Driving | --- | --- | --- | M | E2 |
| V-Driving | G1 | A | --- | --- | --- |
| V-Driving | G2 | --- | K | M | --- |
| V-Driving | G3 | C | --- | --- | --- |
| V-Driving | G4 | --- | D' | M | --- |
| V+E-Driving | G1 | A | --- | L | E1 |
| V+E-Driving | G2 | --- | K | M | E2 |
| V+E-Driving | G3 | C | --- | M | E2 |
| V+E-Driving | G4 | --- | D' | M | E2 |

Fig.2a

| Operating Mode | VM | S1' | S2" | S3' | M' | EM |
|---|---|---|---|---|---|---|
| EDA-Mode | G3 | -- | K | -- | -- | -- |
| E-Driving | -- | -- | -- | L | -- | E1 |
| E-Driving | -- | -- | -- | -- | X | E2 |
| V-Driving | G1 | A | -- | -- | -- | -- |
| V-Driving | G2 | -- | B | -- | -- | -- |
| V-Driving | G3 | -- | -- | K | X | -- |
| V-Driving | G4 | D | -- | -- | -- | -- |
| V-Driving | G5 | -- | E | -- | -- | -- |
| V+E-Driving | G1 | A | -- | L | -- | E1 |
| V+E-Driving | G2 | -- | B | L | -- | E1 |
| V+E-Driving | G3 | -- | -- | K | X | E2 |
| V+E-Driving | G4 | D | -- | -- | X | E2 |
| V+E-Driving | G5 | -- | E | -- | X | E2 |

Fig.5a

| Operating Mode | VM | S1 | S2 | S3 | L' | M' | EM |
|---|---|---|---|---|---|---|---|
| EDA-Mode | G2 | -- | -- | K | -- | -- | -- |
| E-Driving | -- | -- | -- | -- | X | -- | E1 |
| E-Driving | -- | -- | -- | -- | -- | X | E2 |
| V-Driving | G1 | A | -- | -- | -- | -- | -- |
| V-Driving | G2 | -- | B | -- | -- | -- | -- |
| V-Driving | G3 | C | -- | -- | -- | -- | -- |
| V-Driving | G4 | -- | D | -- | -- | -- | -- |
| V+E-Driving | G1 | A | -- | -- | X | -- | E1 |
| V+E-Driving | G2 | -- | B | -- | X | -- | E1 |
| V+E-Driving | G3 | C | -- | -- | -- | X | E2 |
| V+E-Driving | G4 | -- | D | -- | -- | X | E2 |

Fig.6a

| Operating Mode | VM | S1 | S2' | S4' | M' | S5 | EM |
|---|---|---|---|---|---|---|---|
| Charge/Start | G2 | --- | K | --- | X | --- | E2 |
| EDA-Mode | G2 | --- | K | --- | --- | U | --- |
| E-Driving | --- | --- | --- | L | --- | U | E1 |
| E-Driving | --- | --- | --- | --- | X | U | E2 |
| V-Driving | G1 | A | --- | --- | --- | U | --- |
| V-Driving | G2 | --- | K | --- | X | U | --- |
| V-Driving | G3 | C | --- | --- | --- | U | --- |
| V-Driving | G4 | --- | D' | --- | X | U | --- |
| V+E-Driving | G1 | A | --- | L | --- | U | E1 |
| V+E-Driving | G2 | --- | K | --- | X | U | E2 |
| V+E-Driving | G3 | C | --- | --- | X | U | E2 |
| V+E-Driving | G4 | --- | D' | --- | X | U | E2 |

Fig.7a

| Operating Mode | VM | S1 | S2 | S3 | L' | M' | S5' | EM |
|---|---|---|---|---|---|---|---|---|
| Charge/Start | G2 | --- | --- | K | --- | --- | O | E2 |
| EDA-Mode | G2 | --- | --- | K | --- | --- | N | --- |
| E-Driving | --- | --- | --- | --- | X | --- | N | E1 |
| E-Driving | --- | --- | --- | --- | --- | X | N | E2 |
| V-Driving | G1 | A | --- | --- | --- | --- | N | --- |
| V-Driving | G2 | --- | B | --- | --- | --- | N | --- |
| V-Driving | G3 | C | --- | --- | --- | --- | N | --- |
| V-Driving | G4 | --- | D | --- | --- | --- | N | --- |
| V+E-Driving | G1 | A | --- | --- | X | --- | N | E1 |
| V+E-Driving | G2 | --- | B | --- | X | --- | N | E1 |
| V+E-Driving | G3 | C | --- | --- | --- | X | N | E2 |
| V+E-Driving | G4 | --- | D | --- | --- | X | N | E2 |

Fig.8a

HYBRID DRIVE OF A MOTOR VEHICLE

FIELD OF THE INVENTION

The invention relates to a hybrid drive of a motor vehicle, which features an internal combustion engine with a drive shaft, an electric machine with a rotor operable as a motor and as a generator, an automated manual transmission carried out in a lay-shaft design with one input shaft and at least one output shaft, along with a phase shifter gearbox carried out in a planetary design with two input elements and one output element. The input shaft of the manual transmission is connected to the drive shaft of the internal combustion engine through a separating clutch and can be brought into drive connection with the output shaft through several selectively shiftable spur gear stages. The drive shaft of the internal combustion engine and the rotor of the electric machine are connectable in terms of drive technology to the output shaft of the manual transmission through the phase shifter gearbox drive.

BACKGROUND

It is generally known that, with a hybrid drive for a motor vehicle, a phase shifter gearbox (i.e., a gear arrangement that permits superimposition of torque from the engine and electric machine) formed in a planetary design can be used for the superimposition of the torques and rotational speeds of an internal combustion engine and an electric machine. Compared to other types of phase shifter gearboxes, a planetary transmission has the advantage of compact dimensions and balanced bearing loads of the transmission components.

DE 199 34 696 A1 describes a combination of an internal combustion engine, an electric machine and a phase shifter gearbox designated as an electrodynamic drive system (EDA), which is upstream of a manual transmission carried out in a lay-shaft design and enables wear-free start-up. In a first embodiment of this hybrid drive according to FIG. 1 therein, the phase shifter gearbox is formed as a simple planetary transmission with one sun gear, one planetary carrier supporting several planetary gears and one ring gear. The ring gear of the planetary transmission is connected in a torque-proof manner to the drive shaft of the internal combustion engine and forms the first input element of the phase shifter gearbox. The sun gear of the planetary transmission is connected in a torque-proof manner to the rotor of the electric machine and forms the second input element of the phase shifter gearbox. The planetary carrier of the planetary transmission is connected in a torque-proof manner to the input shaft of the manual transmission and forms the output element of the phase shifter gearbox.

With this hybrid drive, the wear-free start-up takes place by the fact that, with a largely constant rotational speed of the internal combustion engine, the electric machine is initially controlled in generator mode with increasing drag torque until it reaches the rotor standstill, and is then accelerated during engine mode with a reverse direction of rotation until reaching the synchronization of the transmission components of the planetary transmission. Upon reaching the synchronization in the planetary transmission, a lock-up clutch arranged between the sun gear and the planetary carrier is closed, such that, in the further course of the internal combustion engine driving mode, the planetary transmission revolves as a unit. In this operating state, the electric machine can be operated as a motor for a boost operation, operated as a generator for the charging of an electric energy storage device, or switched to powerless. If the drive shaft of the internal combustion engine is connected to the ring gear of the planetary transmission through a separating clutch that can be engaged and disengaged, the internal combustion engine can also be decoupled and stopped in order to enable pure electric driving mode. The manual transmission of this hybrid drive can be used, without any change, for a conventional drive, with which the start-up with the internal combustion engine takes place, subject to wear, through the slip operation of a separating clutch formed as a friction clutch.

Arrangements of an internal combustion engine, an electric machine and a phase shifter gearbox that are similar in structure and function and are likewise allocated to a manual transmission are known from U.S. Pat. No. 5,839,533 A and DE 10 2004 005 349 A1.

In contrast to the aforementioned hybrid drives, DE 10 2007 042 949 A1 describes a hybrid drive, with which an arrangement of an internal combustion engine, an electric machine and a phase shifter gearbox is upstream in terms of drive technology of a manual transmission carried out in a lay-shaft design with two input shafts and a common output shaft. The phase shifter gearbox is in turn formed as a simple planetary transmission. The ring gear of the planetary transmission is connected in a torque-proof manner to the first input shaft of the manual transmission, which is connected on the input side to the drive shaft of the internal combustion engine through a separating clutch formed as a friction clutch and is brought into drive connection within the manual transmission to the output shaft of the manual transmission selectively through a first group of shiftable spur gear stages. Thus, the ring gear of the planetary transmission forms the first input element of the phase shifter gearbox. The sun gear of the planetary transmission is connected in a torque-proof manner to the rotor of the electric machine and therefore forms the second input element of the phase shifter gearbox. The planetary carrier of the planetary transmission is connected in a torque-proof manner to the second input shaft of the manual transmission, which is formed as a hollow shaft, is arranged coaxially through the first input shaft, and is brought into drive connection, within the transmission, with the output shaft of the manual transmission selectively through a second group of shiftable spur gear stages. Accordingly, the planetary carrier of the planetary transmission forms the output element of the phase shifter gearbox.

With this hybrid drive, the start-up can be carried out free of wear with a shifted spur gear stage of the second group as with hybrid drives described above. In normal driving mode, the two input shafts are connected to each other in a torque-proof manner through a coupling shift element, by which the planetary transmission is blocked in itself, thus revolves in the block. With such hybrid drive, it is also possible to, upon a gearshift between two spur gear stages of both groups, synchronize the shifting clutch of the spur gear stage of the target gear with an open coupling shift element by means of the electric machine. Such a manual transmission can be derived from a dual-clutch transmission, with which, instead of the electric machine and the phase shifter gearbox, a second separating clutch formed as a friction clutch is provided, through which the second input shaft is connectable to the drive shaft of the internal combustion engine.

Arrangements of an internal combustion engine, an electric machine and a phase shifter gearbox that are similar in structure and function and are upstream in terms of drive technology of a manual transmission with two input shafts and one output shaft are also known from U.S. Pat. No. 6,645,105 B2 and DE 10 2006 059 591 A1.

In contrast to the aforementioned hybrid drives, DE 10 2010 030 567 A1 and DE 10 2010 043 354 A1 describe hybrid drives with which a manual transmission formed in a lay-shaft design, which is combined with a phase shifter gearbox formed in a planetary design for the linkage of an electric machine in terms of drive technology, is specifically designed for use in a hybrid drive.

In a first embodiment of the hybrid drive of DE 10 2010 030 567 A1 according to FIG. 1 therein, the two input shafts are arranged in a manner coaxially and axially adjacent to each other, and are connectable to each other in a torque-proof manner through a coupling shift element. The first input shaft is connectable to the drive shaft of the internal combustion engine through a separating clutch formed as a friction clutch and can be brought into drive connection with the output shaft through a shiftable spur gear stage. The phase shifter gearbox formed as a simple planetary transmission is arranged in a manner coaxially and axially adjacent to the second input shaft. The ring gear of such planetary transmission is connected in a torque-proof manner to the second input shaft of the manual transmission, which is connectable in a torque-proof manner to the first input shaft through a coupling shift element and can be brought into drive connection with the output shaft through a shiftable spur gear stage. Thus, the ring gear of the planetary transmission forms the first input element of the phase shifter gearbox. The sun gear of the planetary transmission is connected in a torque-proof manner to the rotor of the electric machine and therefore forms the second input element of the phase shifter gearbox. The planetary carrier of the planetary transmission is connectable in a torque-proof manner to the second input shaft of the manual transmission through a bypass shift element and can be brought into drive connection with the output shaft through an additional shiftable spur gear stage. Accordingly, the planetary carrier of the planetary transmission forms the output element of the phase shifter gearbox.

Such known hybrid drive features, in addition to the possibility of wear-free start-up, three gears for the internal combustion engine driving mode and two gears for the electromotive driving mode. It is also possible to charge an electric energy storage device by means of the internal combustion engine and to start a motor of the internal combustion engine by means of the electric machine. The small number of gear steps available in the internal combustion engine driving mode and, based on the drag losses of the spur gear stages, the low transmission efficiency in the electric driving mode can be specified as disadvantages of such hybrid drive.

With the hybrid drive according to DE 10 2010 043 354 A1, a phase shifter gearbox formed as a simple planetary transmission is arranged inside the manual transmission carried out in a lay-shaft design that features two input shafts and one output shaft. The first input shaft of the manual transmission is arranged in a manner axially parallel to the output shaft, is connected to the drive shaft of the internal combustion engine through a separating clutch formed as a friction clutch, and can be brought into drive connection with the output shaft of the manual transmission through two spur gear stages consisting only of idler gears. The second input shaft of the manual transmission is arranged in a manner axially parallel to the first input shaft and the output shaft, is connected in a torque-proof manner to the rotor of an electric machine, and can likewise be brought into drive connection with the output shaft of the manual transmission through two spur gear stages consisting only of idler gears. The spur gear stage of the first input shaft and the second input shaft are arranged in identical or nearly identical gear levels, and in one case use a common idler gear that is arranged on the output shaft. In another case, the idler gears of the two spur gear stages that are arranged on the output shaft are connected to each other in a torque-proof manner. The phase shifter gearbox formed as a simple planetary transmission is arranged between the two gear levels, coaxially on the output shaft. The ring gear of the planetary transmission is connected in a torque-proof manner to the two idler gears of the first gear level that are connected to each other in a torque-proof manner, can be brought into drive connection with the first input shaft or the second input shaft through a shift element, and is connectable in a torque-proof manner to the output shaft through an additional shift element. Thus, the ring gear can form the first input element or the second input element of the phase shifter gearbox. The sun gear of the planetary transmission is connectable in a torque-proof manner with the common idler gear of the second gear level through a shift element, can be brought into drive connection with the first input shaft or the second input shaft through a shift element, and is directly connectable in a torque-proof manner with the output shaft through an additional shift element. Therefore, the sun gear of the planetary transmission can likewise form the first input element or the second input element of the phase shifter gearbox. The planetary carrier is connected in a torque-proof manner to the output shaft and accordingly forms the output element of the phase shifter gearbox.

This known hybrid drive features, in addition to the option of wear-free driving, seven gears for the internal combustion engine driving mode, including four winding-path gears, and seven gears for the electromotive driving mode, including four winding-path gears. Moreover, with this hybrid drive, is possible to charge an electrical energy storage device through the internal combustion engine and start the motor of the internal combustion engine through the electric machine. However, disadvantages with such hybrid drive include the high total number of required shift elements, the large number of shift elements to be engaged and disengaged for most gears, and the poor transmission efficiency in the winding-path gears.

SUMMARY OF THE INVENTION

Based on the disadvantages of the aforementioned hybrid drives, the invention is subject to a task of proposing a hybrid drive of the aforementioned type of construction, which features a sufficiently high number of gears for the internal combustion engine driving mode and at least two gears with high transmission efficiency for the electromotive driving mode, and the manual transmission of which can be derived from a conventional manual transmission with few changes. Additional objects and advantages of the invention will be set forth in part in the following description, or may be obvious from the description, or may be learned through practice of the invention.

This task is solved in conjunction with the characteristics of a hybrid drive wherein the phase shifter gearbox is arranged coaxially around a free end of the output shaft, and that the first input element of the phase shifter gearbox is connected in a torque-proof manner to a hollow shaft arranged in a coaxial manner around the output shaft, which, for coupling the internal combustion engine through a coupling shift element, is connectable in a torque-proof manner to an idler gear of the directly axially adjacent spur gear stage of the manual transmission, and, for bypassing the phase shifter gearbox through a bypass shift element, is connectable in a torque-proof manner to the second input element or the output element of the phase shifter gearbox, that the second input element of the phase shifter gearbox is permanently in drive connection with the rotor of the electric machine, and that the output element of the phase shifter gearbox is connected in a torque-proof manner to the output shaft.

Advantageous arrangements and additional forms of the hybrid drive in accordance with the invention are set forth herein. A method is provided for the jolt-free switching on of the internal combustion engine in electric driving mode is defined.

Accordingly, the invention is based on a known hybrid drive of a motor vehicle, which features an internal combustion engine with a drive shaft, an electric machine with a rotor operable as a motor and as a generator, an automated manual transmission carried out in a lay-shaft design with one input shaft and at least one output shaft, along with a phase shifter gearbox carried out in a planetary design with two input elements and one output element. The input shaft of the manual transmission is connectable on the input side to the drive shaft of the internal combustion engine through a controllable separator clutch, and can be brought into drive connection on the transmission side with the output shaft of the manual transmission through several selectively shiftable spur gear stages, by which several gear steps are available for the internal combustion engine driving mode. In addition, the drive shaft of the internal combustion engine and the rotor of the electric machine are connectable in terms of drive technology with the output shaft of the manual transmission through the phase shifter gearbox, by which a wear-free start-up, as with the electrodynamic drive system known from DE 199 34 696 A1, is possible.

In contrast to the hybrid drives known to date, with the hybrid drive in accordance with the invention, the phase shifter gearbox carried out in a planetary design is arranged on the edge or outside of the manual transmission at its output shaft and is linked to it. Thus, for the creation of the hybrid drive proposed in the present case, a conventional drive consisting of an internal combustion engine and a manual transmission can be resorted to, with which, through slight changes, the possibility of arranging the phase shifter gearbox and the electric machine in drive connection with it on a correspondingly extended free end of the output shaft is created. For the wear-free start-up, the drive shaft of the internal combustion engine is linked to the first input element of the phase shifter gearbox through the engagement of the coupling shift element through the axially adjacent spur gear stage and the hollow shaft. With an engaged bypass shift element, the phase shifter gearbox is blocked in itself, such that the output shaft of the manual transmission can then be driven solely by the electric machine.

Since at least one additional gear step is advantageous for electric driving mode, the first input element of the phase shifter gearbox or the hollow shaft for shifting a second gear step effective between the rotor of the electric machine and the output shaft of the manual transmission can be locked in a manner fixed to the housing through a locking shift element. Through the locking shift element, the phase shifter gearbox is thus a two-stage manual transmission for electric driving mode. Regardless of the specific arrangement of the phase shifter gearbox, the second gear step features a transmission ratio that is greater than one in absolute terms and is thus provided for the lower gear of electric driving mode.

The electric machine can be arranged in a space-saving manner coaxially at the output shaft of the manual transmission, axially outside next to the phase shifter gearbox, whereas the rotor of the electric machine can be directly connected in a torque-proof manner to the second input element of the phase shifter gearbox.

Alternatively, however, it is also possible for this purpose that the electric machine is arranged coaxially at the output shaft of the manual transmission, axially outside next to the phase shifter gearbox, but that the rotor of the electric machine is in drive connection to the second input element of the phase shifter gearbox through a reduction stage arranged in an axial manner between the phase shifter gearbox and the electric machine and formed as a planetary transmission stage. Through the reduction stage, the rotational speed of the electric machine is reduced and its torque is accordingly increased, such that the electric machine can be formed in a manner with higher rotation and weaker in terms of torque, and thus smaller and lighter than with a direct linkage to the second input element of the phase shifter gearbox. However, through the arrangement of the reduction stage, an enlargement of the axial length of the hybrid drive must be taken into account.

With an arrangement of the electric machine and the reduction stage that is more favorable with regard to the overall axial structural length, it is provided that the electric machine is arranged in a manner axially parallel to the output shaft of the manual transmission radially adjacent to the phase shifter gearbox, and that the rotor of the electric machine is in drive connection with the second input element of the phase shifter gearbox through a reduction stage formed as a spur gear transmission stage.

In order to, in electric driving mode, achieve a high transmission efficiency and thus, with a limited storage capacity of an associated electrical energy storage device of the vehicle, a greater range, the fixed gears of all spur gear stages of the manual transmission are arranged at the input shaft in a torque-proof manner. Thereby, the idler gears of the spur gear stages of the manual transmission are necessarily arranged on the output shaft or on the output shafts, by which the spur gear stages are not driven in electric driving mode, and the corresponding rolling and drag losses are avoided.

In principle, that gear of the manual transmission, the spur gear stage of which is arranged directly axially adjacent to the phase shifter gearbox, is connectable in a torque-proof manner to the output shaft through the associated gear shift element and in a torque-proof manner to the hollow shaft through the coupling shift element. Advantageously, however, it is also possible that this gear is shiftable only through the coupling shift element and through the bypass shift element, since, in this case, the associated gear shift element can be omitted, and corresponding installation space and manufacturing costs can be saved.

Moreover, that gear of the manual transmission, the spur gear stage of which is arranged as next axially adjacent to the phase shifter gearbox, can also be shiftable through the associated gear shift element and the bypass shift element, whereas the relevant gear shift element is then combined with the coupling shift element into one double shift element.

Each of the coupling shift element and/or the bypass shift element and/or the locking shift element is preferably formed as an unsynchronized claw clutch (e.g., a dog clutch), since such shift elements can be synchronized by means of the electric machine. Compared to a synchronizer clutch or a friction clutch, a claw clutch can be manufactured cost-effectively, and is largely wear-free, compact and easier to control.

However, at least the bypass shift element can also be formed as a friction clutch, since, in electric driving mode, traction shifts can be carried out as power shifts. With a traction upshift, the bypass shift element is closed until the locking shift element is mostly load-free. After the locking shift element is disengaged, the bypass shift element is fully closed. Upon a traction downshift, the bypass shift element is opened until the transition to slip mode, by which the electric engine revs up due to its unloading. Upon reaching the synchronous speed at the locking shift element, it is engaged, and thereupon the bypass shift element is fully opened.

However, it is also possible that the bypass shift element and the locking shift element are formed as friction clutches, since, in electric driving mode, traction shifts and thrust shifts can be carried out as power shifts. In this case, upon chronologically exceeding traction upshifts and traction downshifts, and thrust upshifts and thrust downshifts, the shift element of the low gear step effective prior to the gearshift is open and the shift element of the target gear step effective after the gearshift is closed.

For the practical implementation of the phase shifter gearbox, different structural forms of planetary transmissions are suitable. However, due to the simple design and compact structure, the phase shifter gearbox is preferentially formed as a simple planetary transmission with one sun gear, one planetary carrier supporting several planetary gears and one ring gear. With such planetary transmission, the sun gear is the first input element connected in a torque-proof manner to the hollow shaft, the planetary carrier is the output element connected in a torque-proof manner to the output shaft of the manual transmission, and the ring gear is the second input element in drive connection with the rotor of the electric machine.

With this formation and arrangement of the phase shifter gearbox, the transmission ratio effective with a closed locking shift element in the lower gear step of the electric driving mode of the planetary transmission effective as a manual transmission amounts to between 1.25 and 1.67, whereas the transmission ratio of the planetary transmission effective with a closed bypass shift element in the higher gear step of the electric driving mode is equal to one. For the calculation of the overall transmission ratio of the gear steps of the electric driving mode, such transmission ratios must, if applicable, be multiplied by the transmission ratio of the reduction stage, through which the rotor of the electric machine is in drive connection with the second input element of the phase shifter gearbox.

With this embodiment of the phase shifter gearbox, the bypass shift element and the locking shift element are arranged, in a manner that saves space and is favorable in terms of shifting technology, axially behind each other between the coupling shift element and the phase shifter gearbox. In the design of the relevant shift elements as synchronizer clutches or claw clutches, these can also be combined into one double shift element.

For the establishment of a drive connection that is free of output, thus free of propulsion, between the drive shaft of the internal combustion engine and the rotor of the electric machine, which can be used in the generator mode of the electric machine for charging an electrical energy storage device by the internal combustion engine and in engine mode of the electric machine for starting the internal combustion engine by the electric machine, the planetary carrier of the phase shifter gearbox is connected to the output shaft of the manual transmission through a disengageable and engageable separating shift element. For the establishment of such drive connection, the coupling shift element and the bypass shift element are engaged or closed, and the separating shift element is disengaged.

In a second embodiment of the hybrid drive according to the invention, the phase shifter gearbox is formed as a simple planetary transmission with one sun gear, one planetary carrier supporting several planetary gears and one ring gear, the sun gear of which forms the second input element in drive connection with the rotor of the electric machine, the planetary carrier of which forms the output element connected in a torque-proof manner to the output shaft of the manual transmission, and the ring gear of which forms the first input element of the phase shifter gearbox connected in a torque-proof manner to the hollow shaft. With this formation and arrangement of the phase shifter gearbox, the transmission ratio of the planetary transmission effective with a closed locking shift element in the lower gear step of electric driving mode amounts to between 2.5 and 5.0, whereby the transmission ratio of the planetary transmission effective with a closed bypass shift element in the higher gear step of electric driving mode is equal to one.

With this embodiment of the phase shifter gearbox, the bypass shift element and the locking shift element are arranged preferably in a space-saving manner radially staggered next to and/or above the phase shifter gearbox.

With this embodiment of the phase shifter gearbox, in order to enable the establishment of an output-free, thus propulsion-free, drive connection between the drive shaft of the internal combustion engine and the rotor of the electric machine, it is provided that the rotor of the electric machine or the output gear of the reduction stage is connectable through a double shift element alternately to the ring gear or to the sun gear of the phase shifter gearbox. The shifting connection of the rotor of the electric machine or of the output gear of the reduction stage to the sun gear of the planetary transmission effective as the second input element of the phase shifter gearbox corresponds to normal operation, whereas, with a shifted connection to the ring gear of the planetary transmission effective as the first input element of the phase shifter gearbox and the engaged coupling shift element, the output-free or propulsion-free drive connection is established between the drive shaft of the internal combustion engine and the rotor of the electric machine.

In electric driving mode, the power flow takes place, with a closed locking shift element, through the first gear step of the planetary transmission or, with a closed bypass shift element, through the second gear step of the planetary transmission, which, in this operating mode of the hybrid drive, is effective as a two-stage manual transmission. If the switching on of the internal combustion engine is required, which may be the case, for example, due to a mostly discharged electrical energy storage device, the internal combustion engine is initially started, which can take place by means of an associated starter or, with an engaged gear shift element of a spur gear stage of the manual transmission, by closing the separating clutch, if necessary under a simultaneous increase in the torque delivered by the electric machine, through an impulse start.

In order to couple the running internal combustion engine in a manner that is mostly jolt-free, the following method steps are provided:
a) engagement of the gear shifting clutch of the spur gear stage of the lowest gear of the manual transmission, b) load transfer by the internal combustion engine by partially closing the separating clutch and simultaneously the load reduction of the electric machine, c) load-free opening of the shift element of the gear step engaged in the phase shifter gearbox, d) synchronization of the coupling shift element through a corresponding change in rotational speed of the electric machine and the load-free locking of the coupling shift element, e) load buildup of the electric machine and the simultaneous load reduction of the internal combustion engine, f) load-free disengagement of the gear shifting clutch of the spur gear stage of the lowest gear of the manual transmission, g) synchronization of the separating clutch through a corresponding change in rotational speed of the electric machine and/or the internal combustion engine, and h) complete locking of the separating clutch and the transition to the initially described EDA driving mode.

BRIEF DESCRIPTION OF THE DRAWINGS

To clarify the invention, the description is accompanied by a drawing with embodiments. The following is shown therein:

FIG. 1a is an operating and shifting diagram of the hybrid drive in accordance with FIG. 1, in the form of a table, FIG. 2a is an operating and shifting diagram of the hybrid drive in accordance with FIG. 2, in the form of a table, FIG. 5a is an operating and shifting diagram of the hybrid drive in accordance with FIG. 5, in the form of a table, FIG. 6a is an operating and shifting diagram of the hybrid drive in accordance with FIG. 6, in the form of a table, FIG. 7a is an operating and shifting diagram of the hybrid drive in accordance with FIG. 7, in the form of a table, FIG. 8a is an operating and shifting diagram of the hybrid drive in accordance with FIG. 8, in the form of a table.

DETAILED DESCRIPTION

Figure 1:
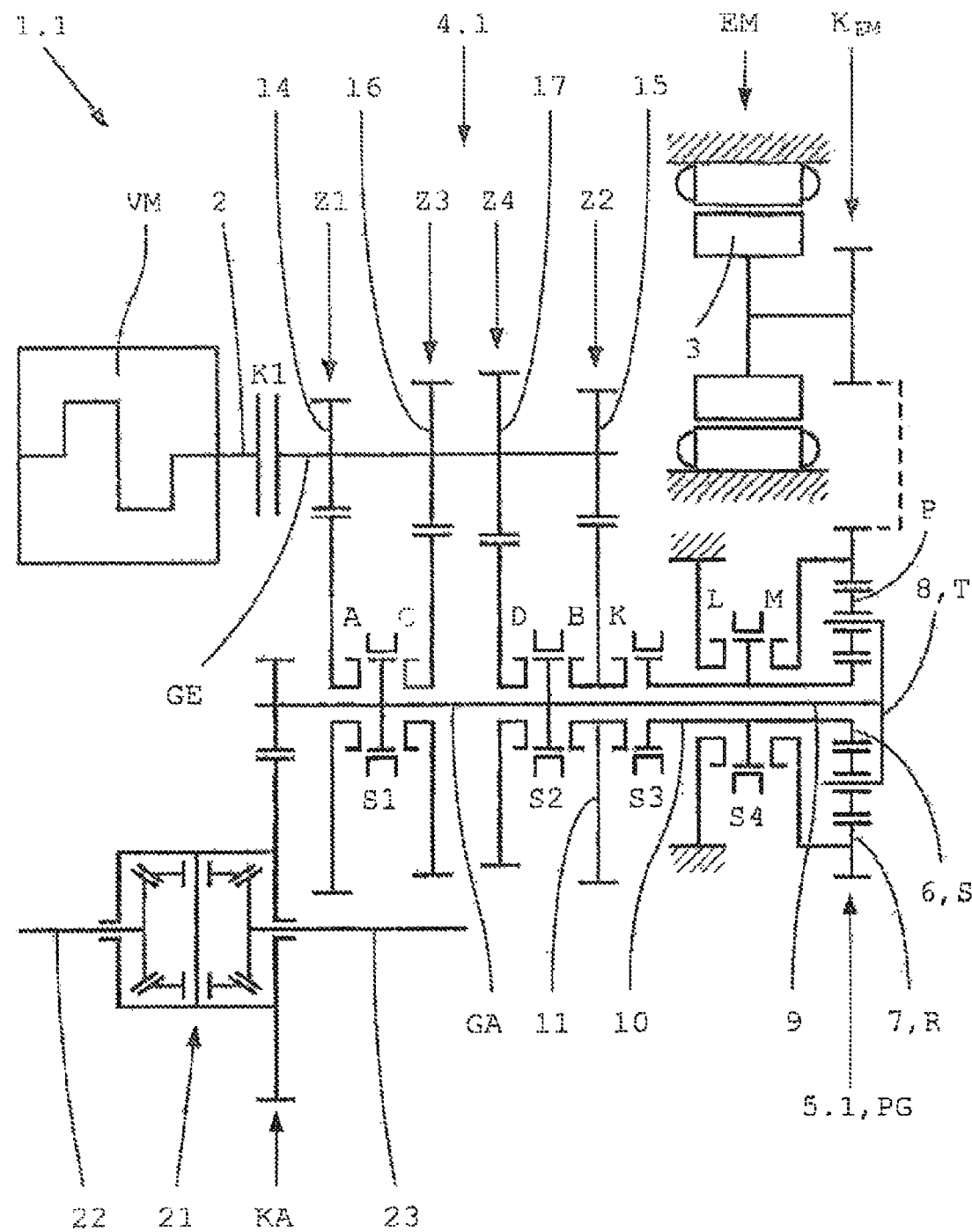
FIG. 1 a first embodiment of a hybrid drive formed in accordance with the invention, in a schematic presentation.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

The first embodiment of the hybrid drive 1.1, schematically shown in FIG. 1, formed in accordance with the characteristics of the invention features an internal combustion engine VM with a drive shaft 2, an electric machine EM operable as a motor and as a generator with a rotor 3, an automated manual transmission 4.1 formed in a lay-shaft design with one input shaft GE and one output shaft GA, along with a phase shifter gearbox 5.1 carried out in a planetary design with two input elements 6, 7 and one output element 8.

The input shaft GE of the manual transmission 4.1 is connected on the input side to the drive shaft 2 of the internal combustion engine VM through a separating clutch K1 formed as a friction clutch. Within the transmission, the input shaft GE of the manual transmission 4.1 can be brought into drive connection with the output shaft GA through four selectively shiftable spur gear stages Z1, Z2, Z3, Z4, each consisting of a fixed gear 14, 15, 16, 17 and one idler gear. The fixed gears 14-17 of the four spur gear stages Z1-Z4 are connected in a torque-proof manner to the input shaft GE. The idler gears of the spur gear stages Z1-Z4 are rotatably mounted on the output shaft GA and are connectable in a torque-proof manner to this through associated gear shift elements A, B, C, D. The gear shift elements A-D are combined in pairs into two double shift elements S1, S2. Through the four spur gear stages Z1-Z4, the manual transmission 4.1 features four shiftable gears G1, G2, G3, G4. The output shaft GA of the manual transmission 4.1 is in drive connection with an axle differential 21 through an output constant KA comprising two gear wheels, of which two drive shafts 22, 23 lead to two drive wheels of the respective vehicle axle not shown in FIG. 1.

The phase shifter gearbox 5.1 is arranged coaxially around the free end 9 of the output shaft GA turned away from the internal combustion engine VM, and is formed as a simple planetary transmission PG with one sun gear S, one planetary carrier T supporting several planetary gears P and one ring gear R.

The sun gear S of the planetary transmission PG or the phase shifter gearbox 5.1 is connected in a torque-proof manner to a hollow shaft 10, which is arranged coaxially around the output shaft GA of the manual transmission 4.1 and is connectable in a torque-proof manner to the idler gear 11 of the directly axially adjacent spur gear stage Z2 through a coupling shift element K. In the present case, the coupling shift element K forms a shifting single shift element S3. Since, with a closed separating clutch K1 and an engaged coupling shift element K, the drive shaft 2 of the internal combustion engine VM is in drive connection with the hollow shaft 10 through the input shaft GE and the spur gear stage Z2 of the second gear G2, the sun gear S of the planetary transmission PG forms the first input element 6 of the phase shifter gearbox 5.1. The planetary carrier T of the planetary transmission PG is connected in a torque-proof manner to the output shaft GA of the manual transmission 4.1, and thus forms the output element 8 of the phase shifter gearbox 5.1.

The electric machine EM is arranged in a manner axially parallel to the output shaft GA of the manual transmission 4.1 and the planetary transmission PG. The rotor 3 of the electric machine EM is in drive connection with the ring gear R of the planetary transmission PG through a reduction stage $K_{EM}$ comprising two gear wheels. Accordingly, the ring gear R of the planetary transmission PG forms the second input element 7 of the phase shifter gearbox 5.1.

Through the reduction stage $K_{EM}$, the rotational speed of the electric machine EM is reduced, and its torque is correspondingly increased, such that the electric machine EM can be formed in a manner with higher rotation and weaker in terms of torque, and thus smaller and lighter than with a direct linkage effective for the drive to the second input element 7 of the phase shifter gearbox 5.1.

In addition, the ring gear R of the planetary transmission PG is connected in a torque-proof manner to the hollow shaft 10 through a bypass shift element M. With an engaged bypass shift element M, the planetary transmission PG is blocked in itself and revolves as a block. Through a locking shift element L, which is combined together with the bypass shift element M into one double shift element S4, the hollow shaft 10 and the sun gear S of the planetary transmission PG connected in a torque-proof manner to it can be locked in a manner fixed to the housing. In addition to the function of a phase shifter gearbox for the coupling in terms of drive technology of the internal combustion engine VM and the electric machine EM to the output shaft GA of the manual transmission 4.1, the planetary transmission PG thus also has the function of a two-stage manual transmission for electric driving mode, with which the drive of the motor vehicle takes place only through the electric machine EM. In the present case, the first gear step E1 of electric driving mode is engaged with a transmission ratio greater than one with an engaged locking shift element L, whereas the second gear step E2 of electric driving mode is effective with the transmission ratio of one with an engaged bypass shift element M.

In the present case, the four gear shift elements A-D of the manual transmission 4.1 along with the coupling shift element K, the bypass shift element M and the locking shift element L are formed as unsynchronized claw clutches, since each of them can be synchronized by means of the electric machine EM and/or the internal combustion engine VM.

Together with the electric machine EM, the phase shifter gearbox is 5.1 is flange-mounted on the front side to the manual transmission 4.1. In order to create the present hybrid drive 1.1 from a conventional drive, which consists of the internal combustion engine VM and a largely identical manual transmission, only minor changes to the manual transmission are required, such as, for example, a corresponding extension of the output shaft GA and a supplement to the shifting device of the coupling shift element K.

The possible operating modes of the hybrid drive 1.1 are combined in the table of FIG. 1a, in which each effective gear G1, G2, G3, G4 of the manual transmission 4.1 is indicated for the internal combustion engine VM, each effective gear step E1, E2 of the planetary transmission PG is indicated for the electric machine EM, and each engaged shift element A, B, C, D; K, L, M is indicated for the double shift elements S1, S2, S4 along with the single shift element S3.

In EDA operating mode, which is primarily used for wear-free start-up, the planetary transmission PG is effective as a phase shifter gearbox 5.1; that is, the torques and rotational speeds of the internal combustion engine VM and the electric machine EM are overlaid in the phase shifter gearbox 5.1 and transferred to the output shaft GA. For this purpose, the drive shaft 2 of the internal combustion engine VM is linked to the sun gear S of the planetary transmission PG effective as the first input element 6 of the phase shifter gearbox 5.1 through closing the separating clutch K1 and engaging the coupling shift element K in terms of drive technology through the input shaft GE, the spur gear stage Z2 of the manual transmission 4.1 and the hollow shaft 10. The rotor 3 of the electric machine EM is in drive connection, in any event permanently, with the ring gear R of the planetary transmission PG effective as the second input element 7 of the phase shifter gearbox 5.1 through the reduction stage $K_{EM}$. Likewise, the planetary carrier T of the planetary transmission PG effective as the output element 8 of the phase shifter gearbox 5.1 is permanently connected in a torque-proof manner to the output shaft GA of the manual transmission 4.1.

Analogous to the operation of the electrodynamic drive system (EDA) described in DE 199 34 696 A1, wear-free start-up takes place by the fact that, with a largely constant rotational speed of the internal combustion engine VM, the electric machine EM is initially controlled in generator mode with increasing drag torque until it reaches the rotor standstill, and is then accelerated in engine mode with the reverse rotational direction. This can take place until reaching the synchronization of the transmission components R, S, T of the planetary transmission PG, whereupon the bypass shift element M is closed, and EDA mode is thus terminated.

However, since the drive shaft 2 of the internal combustion engine VM is linked in terms of drive technology to the phase shifter gearbox 5.1 through the spur gear stage Z2 of the second gear G2, EDA mode can also be terminated early, specifically if synchronous operation is achieved at the gear shift element A of the spur gear stage Z1 of the first gear G1. The transition into internal combustion engine driving mode through the engaging of the gear shift element A of the spur gear stage Z1 of the first gear G1, the cancellation shifting of the electric machine EM, and the disengaging of the coupling shift element K. Through the early termination of EDA mode, depending on the specific transmission ratio relationships, the engine mode of the electric machine EM can be curtailed or even completely prevented, which is particularly advantageous with a mostly discharged electric energy storage device.

In electric driving mode (E-driving), the planetary transmission PG effective as a two-stage transmission and the gear steps E1, E2 are shiftable through the locking shift element L and the bypass shift element M. With the present formation and arrangement of the phase shifter gearbox 5.1, the transmission ratio effective with a closed locking shift element L in the lower gear step E1 of the electric driving mode of the planetary transmission PG effective as a manual transmission is between 1.25 and 1.67, whereas the transmission ratio of the planetary transmission PG effective with a closed bypass shift element M in the higher gear step E2 of the electric driving mode is equal to one. For the calculation of the overall transmission ratio of the gear steps E1, E2 of the electric driving mode, such transmission ratios must be multiplied by the transmission ratio of the reduction stage $K_{EM}$, through which the rotor 3 of the electric machine EM is in drive connection with the second input element 7 of the phase shifter gearbox 5.1.

In internal combustion engine driving mode (V-driving), the corresponding gears G1-G4 are shifted through the gear shift elements A-D of the spur gear stages Z1-Z4 of the manual transmission 4.1.

In hybrid mode (V+E driving), the electric machine EM is linked in terms of drive technology to the output shaft GA of the manual transmission 4.1 through a suitable gear step E1, E2 of the planetary transmission PG, thus with a fixed transmission ratio. Thereby, the electric machine EM can be operated, optionally, in boost mode as an engine for the support of the internal combustion engine VM, or as a generator for the charging of an electrical energy storage device.

With the present hybrid drive 1.1, the charging of an electrical energy storage device, with which the electric machine EM operated as a generator upon vehicle standstill is driven by the internal combustion engine VM, is possible with a closed separating clutch K1 and an engaged coupling shift element K. However, for this purpose, for the locking of the planetary carrier T of the planetary transmission PG, the output shaft GA of the manual transmission 4.1 must be blocked, which can take place, for example, through the engaging of a parking lock.

Figure 2:
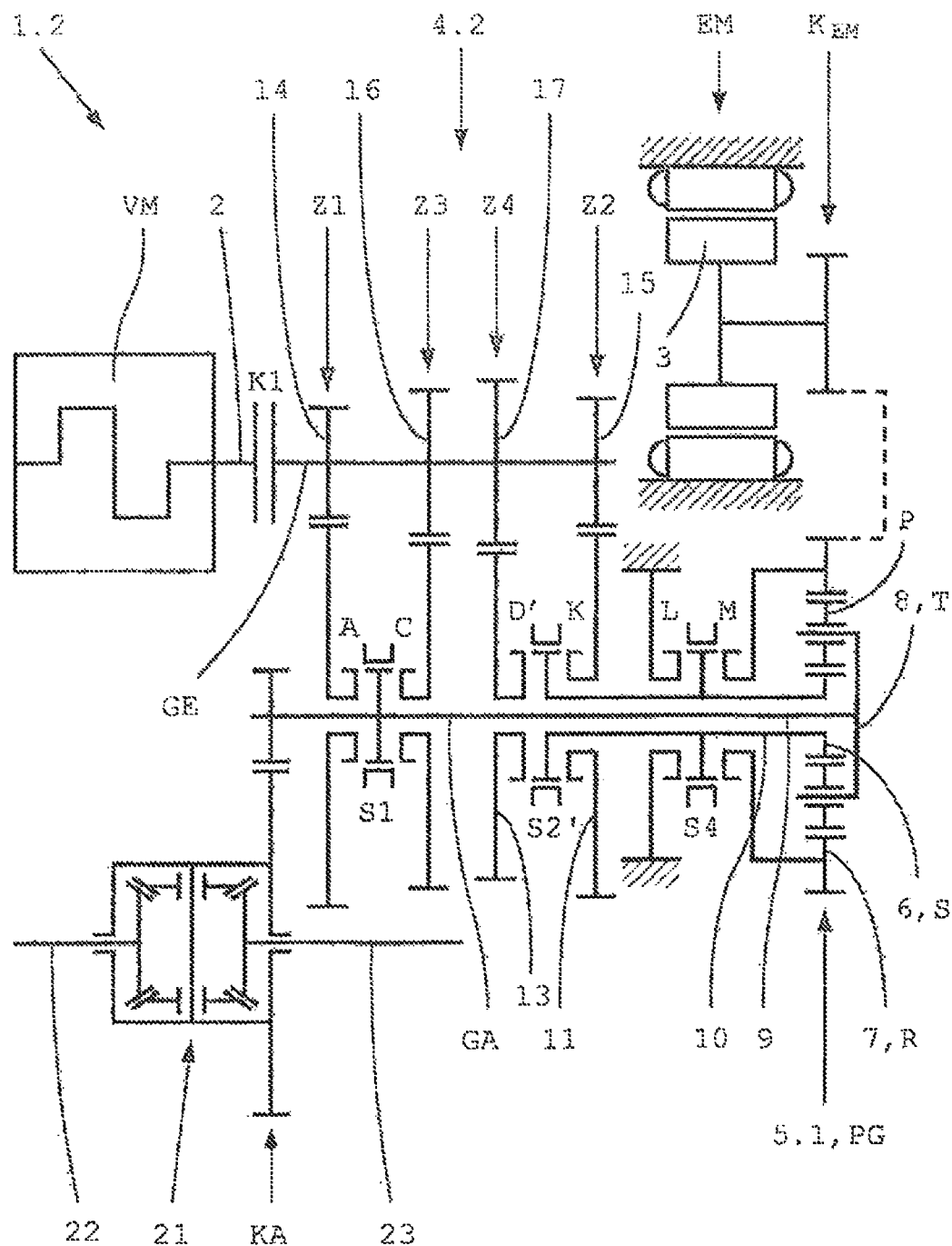
FIG. 2 is a second embodiment of a hybrid drive, in a schematic presentation.

A second embodiment of a hybrid drive 1.2 according to the features of the invention schematically illustrated in FIG. 2 differs, with a largely similar structure of the first embodiment of the hybrid drive 1.1 according to FIG. 1, through a stronger integration of the coupling shift element K in the manual transmission 4.2. Now, in particular the spur gear stage Z2 of the manual transmission 4.2 arranged directly axially adjacent to the phase shifter gearbox 5.1 is shiftable exclusively through the coupling shifting device K, thus sparing the previously associated gear shift element B. This means that, for the engagement of the second gear G2 of the manual transmission 4.2, in addition to the coupling shift element K, the bypass shift element M must also be engaged, such that the idler gear 11 of the spur gear stage Z2 is connected in a torque-proof manner to the output shaft GA of the manual transmission 4.2 through the hollow shaft 10 and the planetary transmission PG blocked in itself. In the present case, the idler gear 13 of the spur gear stage Z4 arranged as next axially adjacent to the phase shifter gearbox 5.1 is connectable in a torque-proof manner to the hollow shaft 10 through the associated gear shift element D', by which the combination of the gear shift element D' with the coupling shift element K into one double shift element S2' is enabled. However, this also means that, for the engagement of the fourth gear G4 of the manual transmission 4.2, in addition to the gear shift element D', the bypass shift element M must also be engaged such that the idler gear 13 of the spur gear stage Z4 is connected in a torque-proof manner to the output shaft GA of the manual transmission 4.2 through the hollow shaft 10 and the planetary transmission PG blocked in itself.

Analogous to the table of FIG. 1a, in the table of FIG. 2a, the possible operating modes of the hybrid drive 1.2 are combined. Since, for engaging the second gear G2 and the fourth gear G4, the engagement of the bypass shift element M is required in each case, in hybrid driving mode with such gears, the electric machine EM can be linked in terms of drive technology to the output shaft GA of the manual transmission 4.2 only with the second gear step E2.

Figure 3:
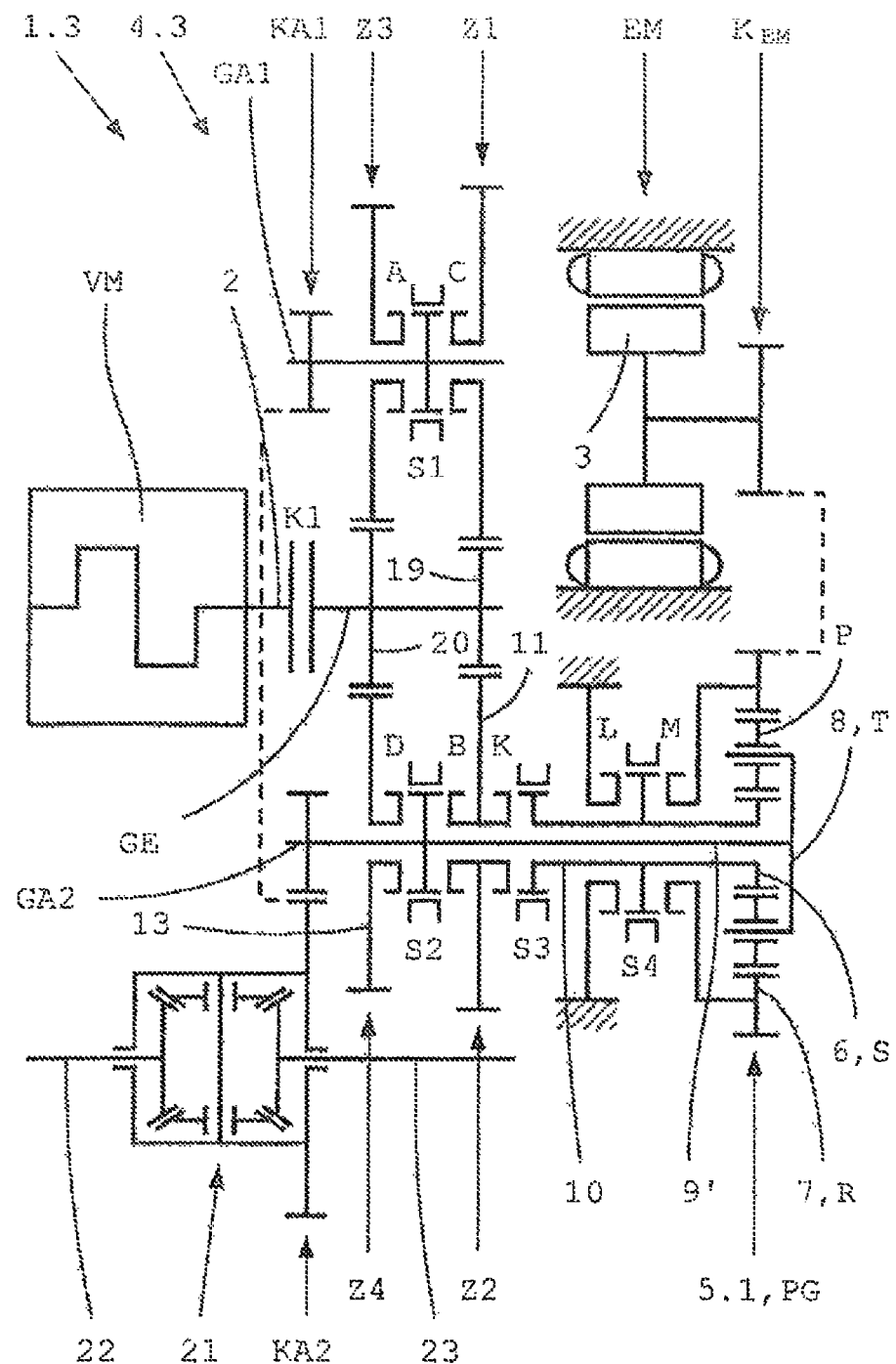
FIG. 3 is a third embodiment of a hybrid drive, in a schematic presentation.

A third hybrid drive 1.3 schematically illustrated in FIG. 3 differs, with the same functioning, only through a different structure of the manual transmission 4.3 of the first embodiment of the hybrid drive 1.1 according to FIG. 1. Thereby, the manual transmission 4.3 features two output shafts GA1, GA2 arranged in a manner axially parallel to the input shaft GE, each of which can be brought into drive connection with the input shaft GE through two shiftable spur gear stages Z1, Z3; Z2, Z4 and each of which is in drive connection with the axle differential 21 through an output constant KA1, KA2 comprising two gear wheels. The spur gear stages Z1, Z3 of the first and third gears G1, G3 of the manual transmission 4.3 are arranged between the input shaft GE and the first output shaft GA1. The spur gear stages Z2, Z4 of the second and fourth gears G2, G4 of the manual transmission 4.3 are arranged between the input shaft GE and the second output shaft GA2. In addition, the four specified spur gear stages Z1-Z4 are arranged in pairs in common gear levels and use two common fixed gears 19, 20 secured in a torque-proof manner to the input shaft GE. The idler gears of the four spur gear stages Z1-Z4 are rotatably mounted on the respective output shafts GA1, GA2, and are connectable in a torque-proof manner to them through associated gear shift elements A, B, C, D. The gear shift elements A, B, C, D are in turn combined in pairs into two double shift elements S1, S2.

With the hybrid drive 1.3, the phase shifter gearbox 5.1 formed identically to the previously described hybrid drives 1.1, 1.2 in accordance with FIG. 1 and FIG. 2 is arranged coaxially around the free end 9' of the second output shaft GA2 turned away from the internal combustion engine VM. For the linkage in terms of drive technology of the internal combustion engine VM, the sun gear S is the planetary transmission PG is connected in a torque-proof manner to the hollow shaft 10, which is now arranged coaxially around the second output shaft GA2 of the manual transmission 4.3 and is connectable in a torque-proof manner to the idler gear 11 of the directly axially adjacent spur gear stage Z2 through a coupling shift element K. The functioning of the present hybrid drive 1.3 is completely identical to that of the hybrid drive 1.1 according to FIG. 1, such that the possible operating modes of the hybrid drive 1.3 can be inferred from the operating and shifting diagram indicated in the table of FIG. 1a.

Figure 4:
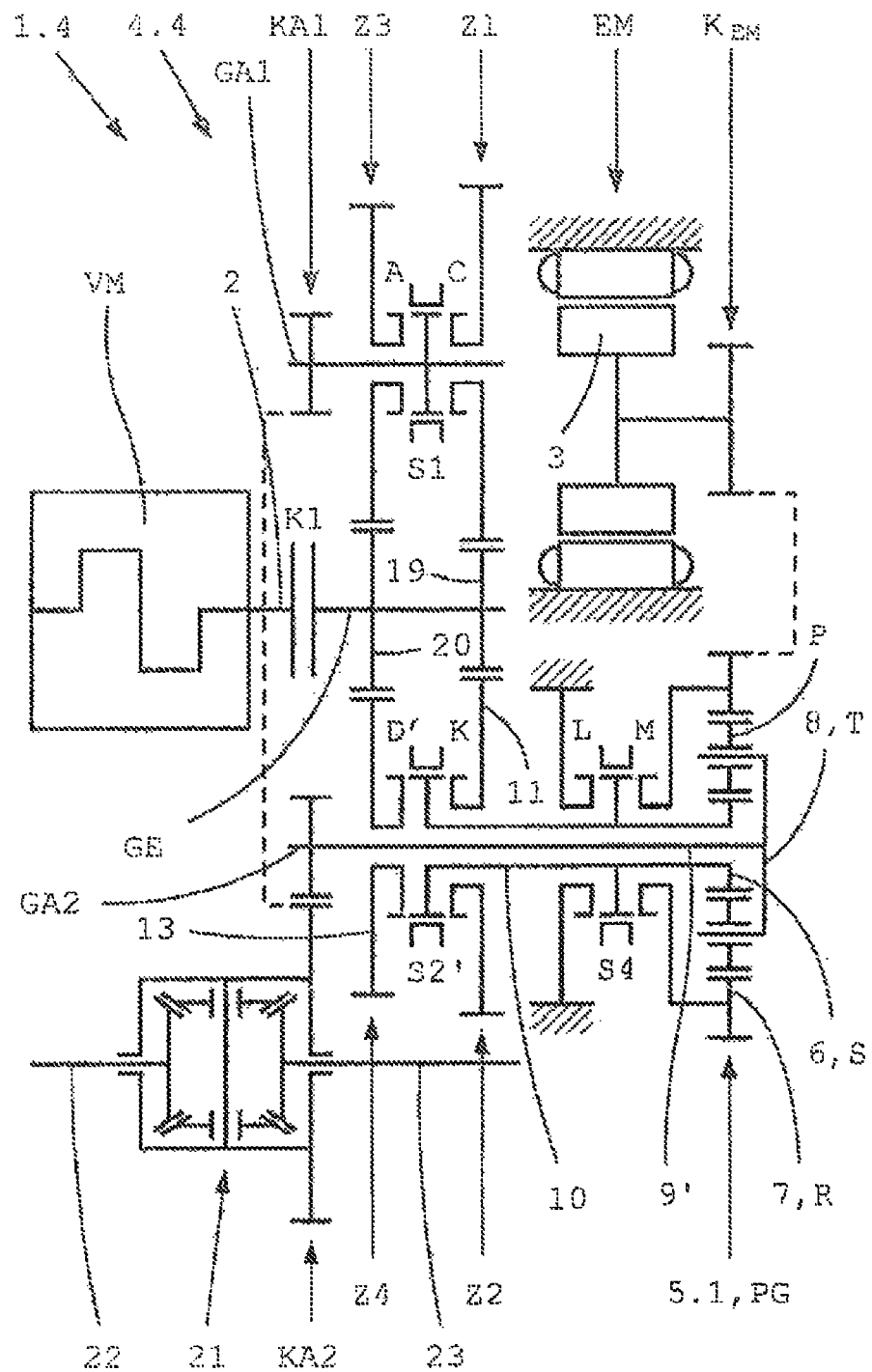
FIG. 4 is a fourth embodiment of a hybrid drive, in a schematic presentation.

A fourth embodiment, schematically shown in FIG. 4, of a hybrid drive 1.4 formed in accordance with the characteristics of the invention differs, with a largely similar structure of the third embodiment of the hybrid drive 1.3 according to FIG. 3, through a stronger integration of the coupling shift element K in the manual transmission 4.4. Analogous to the second embodiment of the hybrid drive 1.2 according to FIG. 2, the spur gear stage Z2 of the manual transmission 4.4 now arranged directly axially adjacent to the phase shifter gearbox 5.1 is shiftable exclusively through the coupling shift element K. Likewise, the idler gear 13 of the spur gear stage Z4 arranged as next axially adjacent to the phase shifter gearbox 5.1 is connectable in a torque-proof manner to the hollow shaft 10 through the associated gear shift element D', in order to enable the combination of this gear shift element D' with the coupling shift element K into one double shift element S2'. The functioning of the present hybrid drive 1.4 is completely identical to that of the second embodiment of the hybrid drive 1.2 according to FIG. 2, such that the possible operating modes of the hybrid drive 1.4 can be inferred from the operating and shifting diagram indicated in the table of FIG. 2a.

Figure 5:
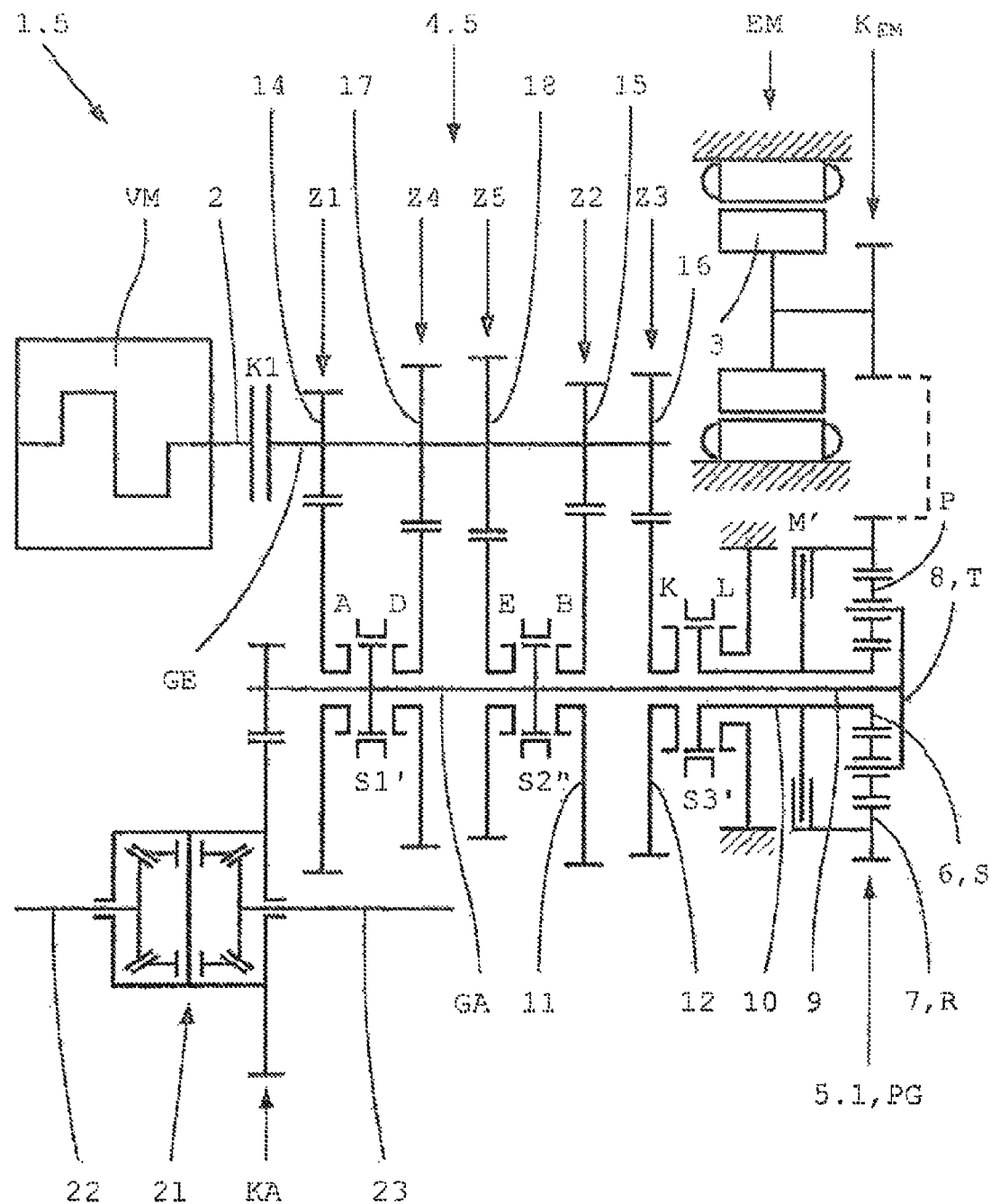
FIG. 5 is a fifth embodiment of a hybrid drive, in a schematic presentation.

A fifth embodiment of a hybrid drive 1.5 formed in accordance with the characteristics of the invention schematically shown in FIG. 5 differs, with a similar functioning, from the hybrid drive 1.2 according to FIG. 2 by a manual transmission 4.5 with five gears G1, G2, G3, G4, G5 and a bypass shift element M' formed as a friction clutch.

The input shaft GE of this manual transmission 4.5 can now be brought into drive connection with the output shaft GA through five selectively shiftable spur gear stages Z1, Z2, Z3, Z4, Z5, each consisting of one fixed gear and one idler gear. The five fixed gears 14, 15, 16, 17, 18 of the five spur gear stages Z1-Z5 are arranged in a torque-proof manner at the input shaft GE. The four idler gears of the first, second, fourth and fifth spur gear stages Z1, Z2, Z4, Z5 are rotatably mounted on the output shaft GA, and are connectable in a torque-proof manner to the output shaft GA through associated gear shift elements A, B, D, E, which are combined in pairs into two double shift elements S1', S2". The idler gear 12 of the third spur gear stage Z3, which in the present case is arranged directly axially adjacent to the phase shifter gearbox 5.1, is also rotatably mounted on the output shaft GA, but, analogous to the idler gear 11 of the second spur gear stage Z2 of the manual transmission 4.2 according to FIG. 2, is shiftable only through the coupling shift element K. Accordingly, for engaging the third gear G3 of the manual transmission 4.5, in addition to the coupling shift element K, the bypass shift element M' must also be closed, which in the present case, however, is formed as a friction clutch. Therefore, the coupling shift element K and the locking shift element L are now combined into one double shift element S3'. The bypass shift element M' connects the sun gear S to the ring gear R. Alternatively, it could also be switched between the sun gear S and the bar T. The third alternative would be an interconnection between the ring gear R and the bar T. In any case, the planetary transmission PG is bridged by the bypass shift element M'.

The possible operating modes of the hybrid drive 1.5 are combined in the table of FIG. 5a, in which the respective effective gears G1, G2, G3, G4, G5 of the manual transmission 4.5 are indicated for the internal combustion engine VM, the respective effective gear steps E1, E2 are indicated for the electric machine EM, and the respective engaged shift elements A, B, C, D; K, L are indicated for the double shift elements S1', S2", S3', and the closed state of the bypass shift element M' is marked in each case with the letter "X."

Since the drive shaft 2 of the internal combustion engine VM, upon a wear-free start in EDA mode, is now linked in terms of drive technology to the phase shifter gearbox 5.1 through the spur gear stage Z3 of the third gear G3, upon reaching the synchronous operation at the gear shift element A of the spur gear stage Z1 of the first gear G1 or at the gear shift element B of the spur gear stage Z2 of the second gear G2, EDA mode may be terminated early, i.e. prior to reaching the synchronization of the transmission components R, S, T of the planetary transmission PG.

The formation of the bypass shift element M' as a friction clutch enables the carrying out of traction shifts in electric driving mode as power shifts. With a traction upshift, the bypass shift element M' is closed until the locking shift element L is mostly load-free. After the locking shift element L is disengaged, the bypass shift element M' is fully closed. Upon a traction downshift, the bypass shift element M' is opened until the transition to slip mode, by which the electric engine EM revs up due to its unloading, thus experiencing an increase in speed. Upon reaching the synchronous speed at the locking shift element L, it is engaged, and the bypass shift element M' is then fully opened.

Figure 6:
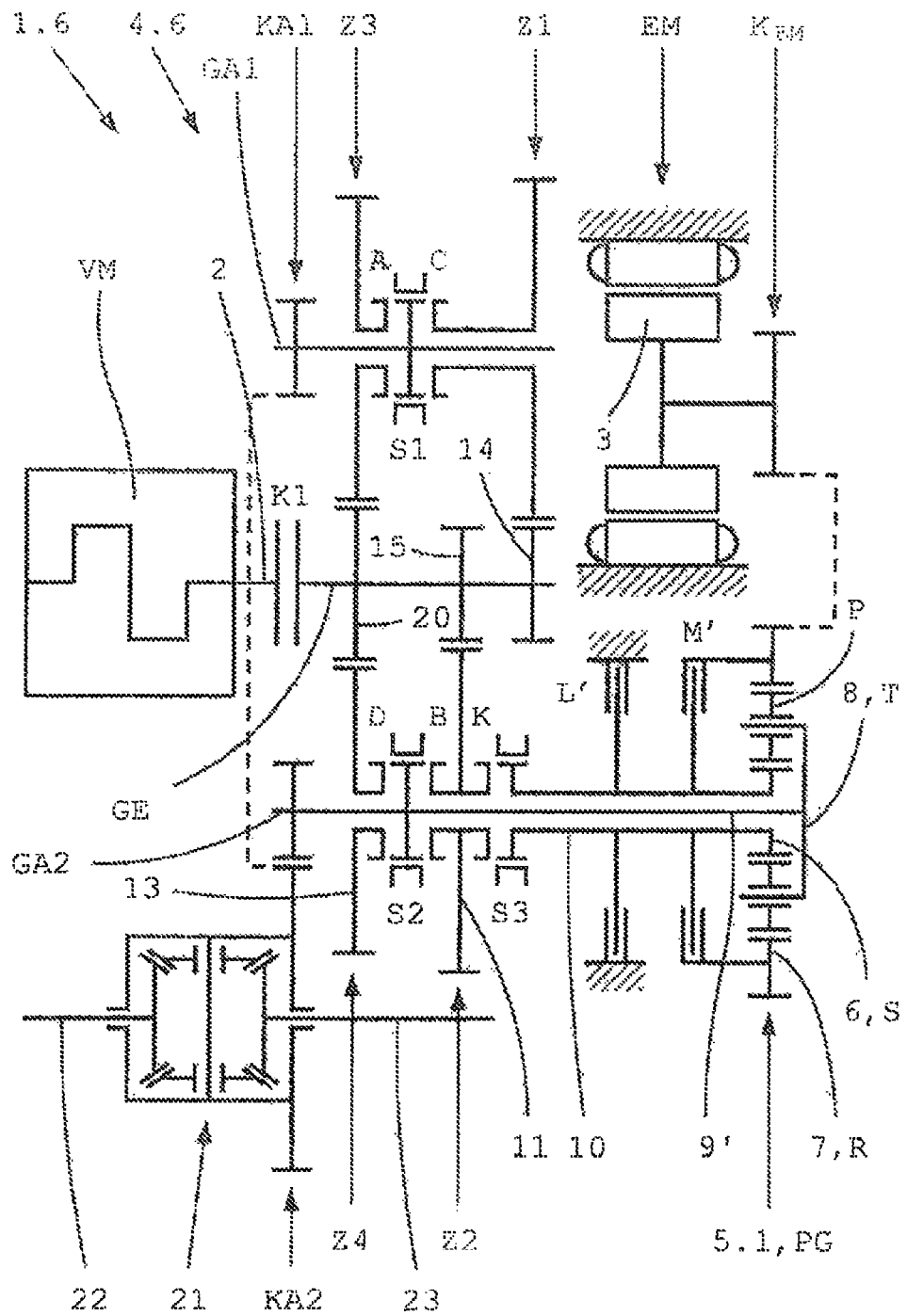
FIG. 6 is a sixth embodiment of a hybrid drive, in a schematic presentation.

The sixth embodiment, schematically shown in FIG. 6, of a hybrid drive 1.6 formed in accordance with the characteristics of the invention is based on the hybrid drive 1.3 according to FIG. 3. In contrast to the latter, the spur gear stages Z1, Z2 of the first gear G1 and the second gear G2 of the manual transmission 4.6 are now arranged in different gear levels, and each accordingly features its own fixed gear 14, 15 secured in a torque-proof manner at the input shaft GE. As a result, there is a greater freedom in calculating the transmission ratios of the four gears G1-G4, which can be used, for example, for the realization of a progressive gear gradation of the manual transmission 4.6.

An additional difference with the hybrid drive 1.3 according to FIG. 3 consists of the fact that, in the present case, both the bypass shift element M' and the locking shift element L' are formed as friction clutches. Thereby, in electric driving mode, both traction shifts and thrust shifts can be carried out as power shifts. With such power shifts, upon chronologically exceeding, the shift element (L' or M') of the low gear step (E1 or E2) effective prior to the gearshift is open and the shift element (M' or L') of the target gear step (E2 or E1) effective after the gearshift is closed.

Analogous to operating and shifting diagram of FIG. 1a applicable for the hybrid drive 1.3 according to FIG. 3, the possible operating modes of the present hybrid drive 1.6 are summarized in the table of FIG. 6, whereas the closed state of locking shift element L' and the bypass shift element M' is marked in each case with the letter "X".

Figure 7:
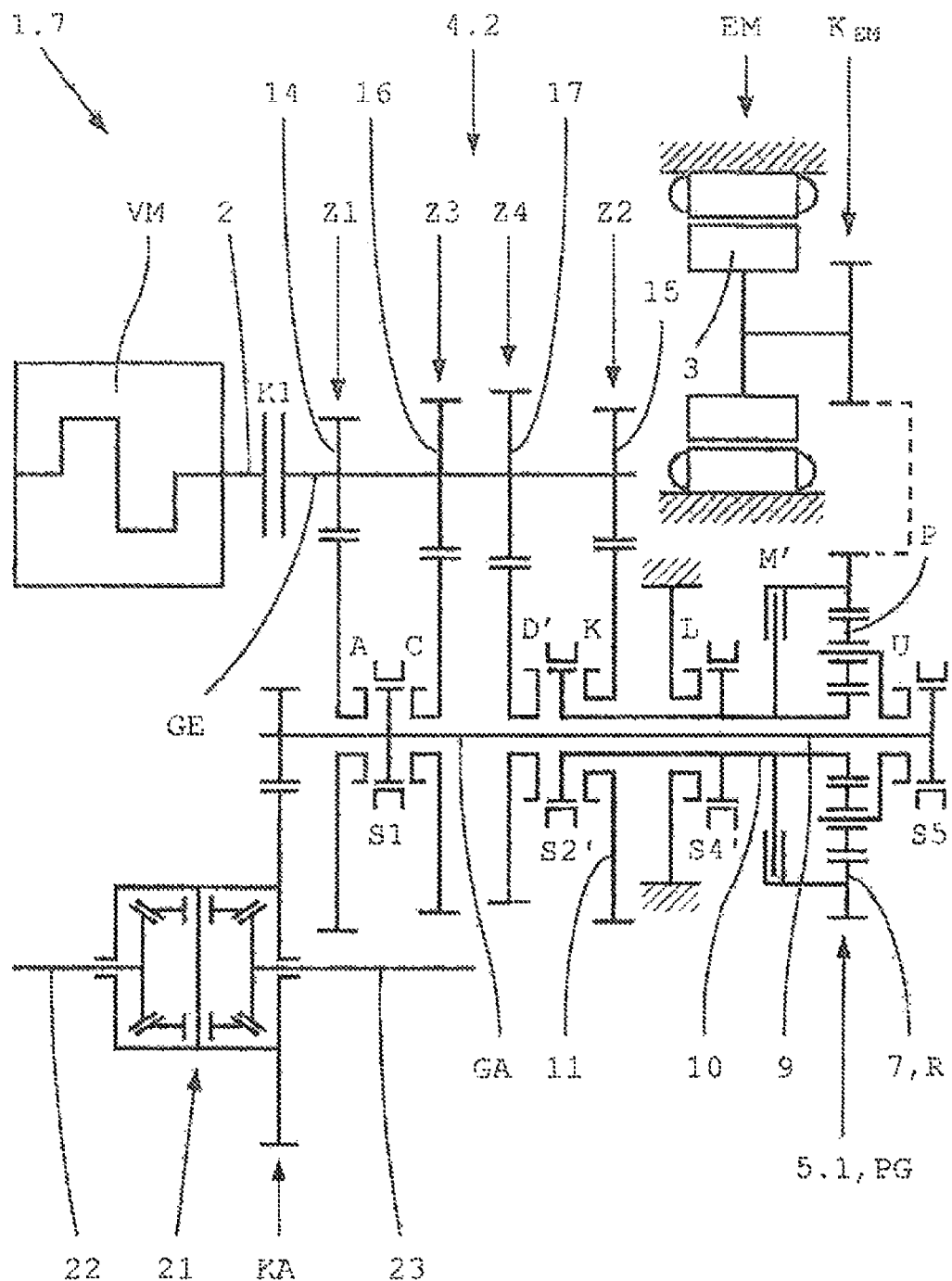
FIG. 7 is a seventh embodiment of a hybrid drive, in a schematic presentation.

In the seventh embodiment, schematically shown in FIG. 7, of a hybrid drive 1.7 formed in accordance with the characteristics of the invention, as an example, the hybrid drive 1.2 according to FIG. 2 is modified to the effect that the bypass shift element M' is formed analogously to the hybrid drive 1.5 according to FIG. 5 as a friction clutch, and that the planetary carrier T of the planetary transmission PG effective as the output element 8 of the phase shifter gearbox 5.1 is connected to the output shaft GA of the manual transmission 4.2 through a disengageable and engageable separating shift element U.

As already explained in the description of the fifth hybrid drive 1.5 according to FIG. 5, the formation of bypass shift element M' as a friction clutch enables the carrying out of traction shifts in electric driving mode as power shifts. In addition, with the present embodiment of the manual transmission 4.2, this has the consequence that the locking shift element L is formed as a single shift element S4'.

The arrangement of the separating shift element U between the planetary carrier T of the phase shifter gearbox 5.1 and the output shaft GA of the manual transmission 4.2 enables the establishment of a drive connection that is free of output, and thus free of propulsion in the outcome, between the drive shaft 2 of the internal combustion engine VM and the rotor 3 of the electric machine EM. With an engaged coupling shift element K, a closed bypass shift element M' and a disengaged separating shift element U, the drive shaft 2 of the internal combustion engine VM and the rotor 3 of the electric machine EM are in drive connection with each other, independent of the output shaft GA of the manual transmission 4.2. This can be used in the generator mode of the electric machine EM for charging an electrical energy storage device through the internal combustion engine VM, and in the engine mode of the electric machine EM for starting the internal combustion engine VM through the electric machine EM.

The possible operating modes of the present hybrid drive 1.7 according to FIG. 7 are summarized in the table of FIG. 7a, whereas the shifting combination for the output-free charging of an electrical energy storage device and the propulsion-free starting of the internal combustion engine under the operating mode of charge/start, and the engaged state of the separating shift element U forming a single shift element S5, are indicated analogously to the shift elements S1, S2', and S4'.

Figure 8:
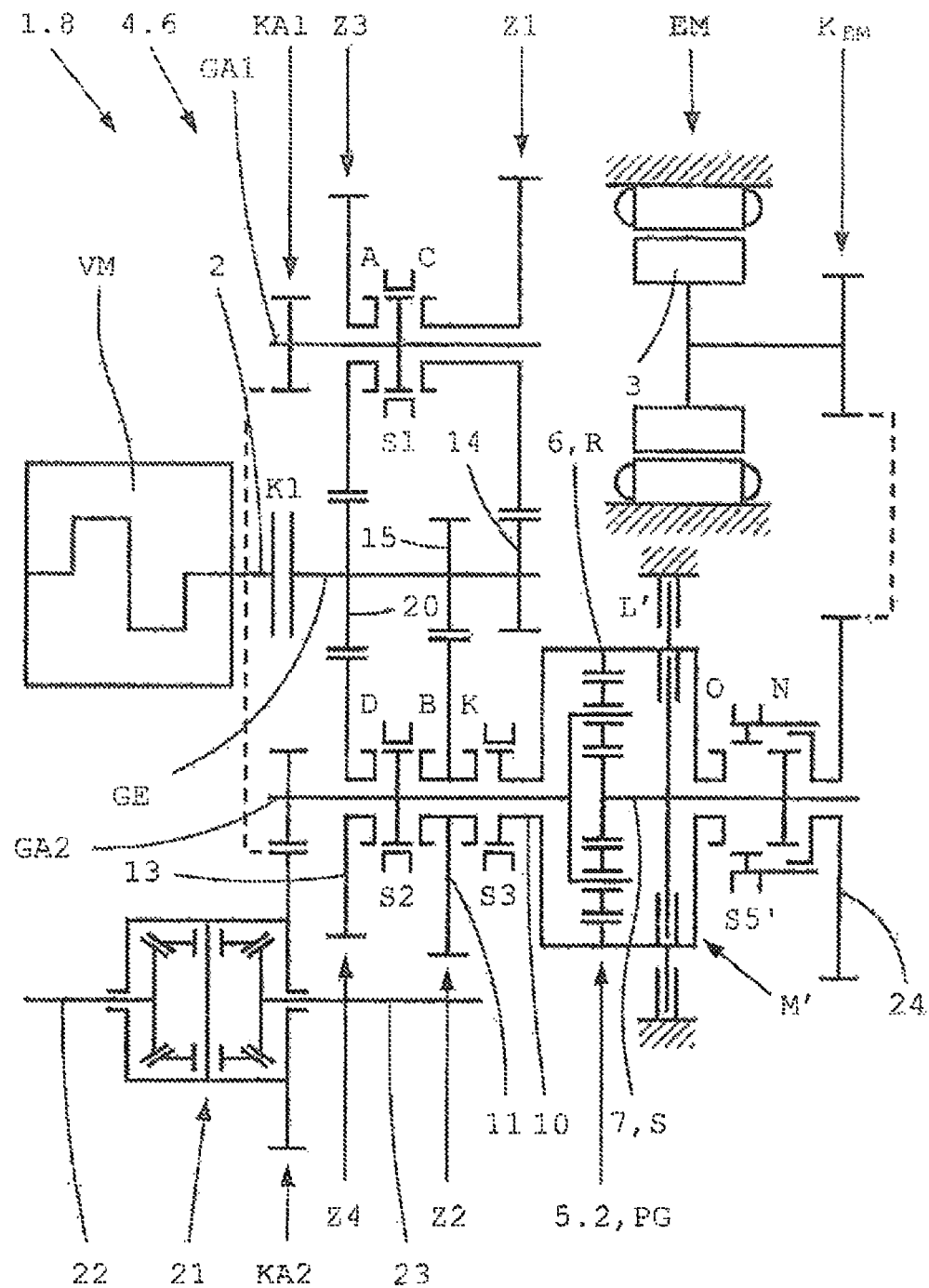
FIG. 8 is an eighth embodiment of a hybrid drive, in a schematic presentation.

In the eighth embodiment, shown in FIG. 8, of a hybrid drive 1.8 formed in accordance with the characteristics of the invention, as an example, the manual transmission 4.6 shown in the hybrid drive 1.6 according to FIG. 6 is used and combined with a modified formation of the phase shifter gearbox 5.2.

The phase shifter gearbox 5.2 is also formed as a simple planetary transmission PG with one sun gear S, one planetary carrier T supporting several planetary gears P and one ring gear R, but, compared to the previous structure of the phase shifter gearbox 5.1, the linkage in terms of drive technology of the sun gear S and the ring gear H is now reversed. With the present embodiment of the phase shifter gearbox 5.2, the ring gear R of the planetary transmission PG is connected in a torque-proof manner to the hollow shaft 10, and thus forms the first input element 6 of the phase shifter gearbox 5.2. The sun gear S of the planetary transmission PG is now in switchable drive connection with the rotor 3 of the electric machine EM through the reduction stage $K_{EM}$, and thus forms the second input element 7 of the phase shifter gearbox 5.2. By contrast, the planetary carrier T of the planetary transmission PG is, as before, connected in a torque-proof manner with the second output shaft GA2 of the manual transmission 4.6, and thus forms the output element 8 of the phase shifter gearbox 5.2. In the present case, the locking shift element and bypass shift element L', M' formed, as with the sixth embodiment of the hybrid drive 1.6, according to FIG. 6 as friction clutches, are arranged in a manner radially staggered, coaxially next to and partially above the phase shifter gearbox 5.2.

With this formation and arrangement of the phase shifter gearbox 5.2 of FIG. 8, the transmission ratio of the planetary transmission PG effective with a closed locking shift element L' in the lower gear step E1 of the electric driving mode is between 2.5 and 5.0, whereas the transmission ratio of the planetary transmission PG effective with the closed bypass shift element M' in the higher gear step E2 of electric driving mode is equal to one.

In order to enable, analogously to the seventh embodiment of the hybrid drive 1.7 according to FIG. 7, the establishment of an output-free or propulsion-free drive connection between the drive shaft 2 of the internal combustion engine VM and the rotor 3 of the electric machine EM, the output gear 24 of the reduction stage $K_{EM}$ is connectable, through a double shift element S5', to the shifting positions N and O, alternately to the ring gear R and the sun gear S of the planetary transmission PG. The shifting connection of the output gear 24 of the reduction stage $K_{EM}$ with the sun gear S effective as the second input element 7 of the phase shifter gearbox 5.2 in the shifting position N of the double shift element S5' corresponds to normal operation. By contrast, with a switched connection with the ring gear R of the planetary transmission PG effective as the first input element 6 of the phase shifter gearbox 5.2 and the engaged coupling shift element K in the shifting position O of the double shift element S5', the output-free drive connection is established between the drive shaft 2 of the internal combustion engine VM and the rotor 3 of the electric machine EM.

The possible operating modes of the hybrid drive 1.8 according to FIG. 8 are summarized in the table of FIG. 8a, whereas the shifting combination for the output-free or propulsion-free charging of an electrical energy storage device and the output-free or propulsion-free starting of the internal combustion engine under the charge/start operating mode, and the respective shifting position of the double shift element S5', are indicated analogously to the shift elements S1-S3.

Figure 9:
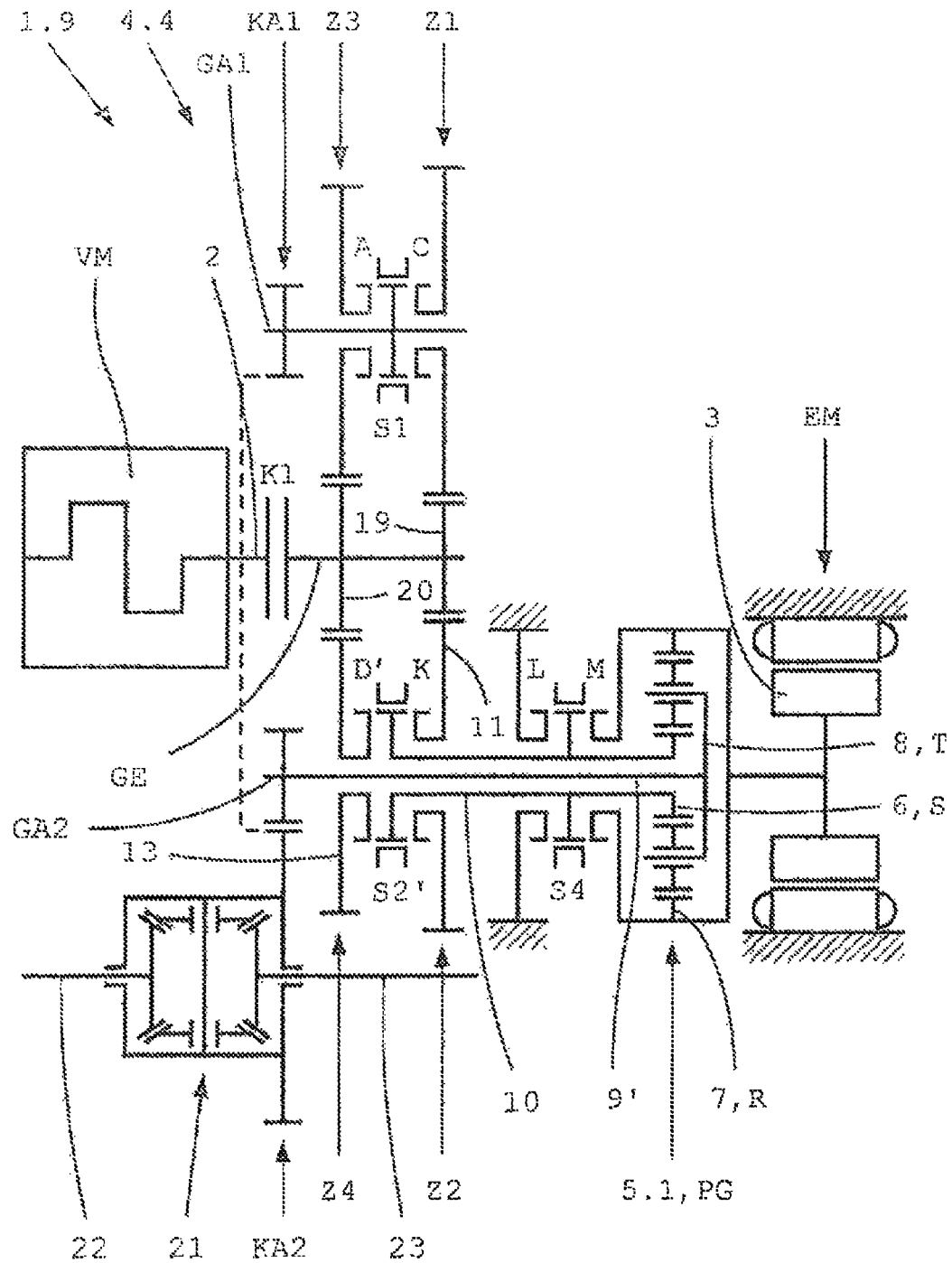
FIG. 9 is a ninth embodiment of a hybrid drive, in a schematic presentation.
Figure 10:
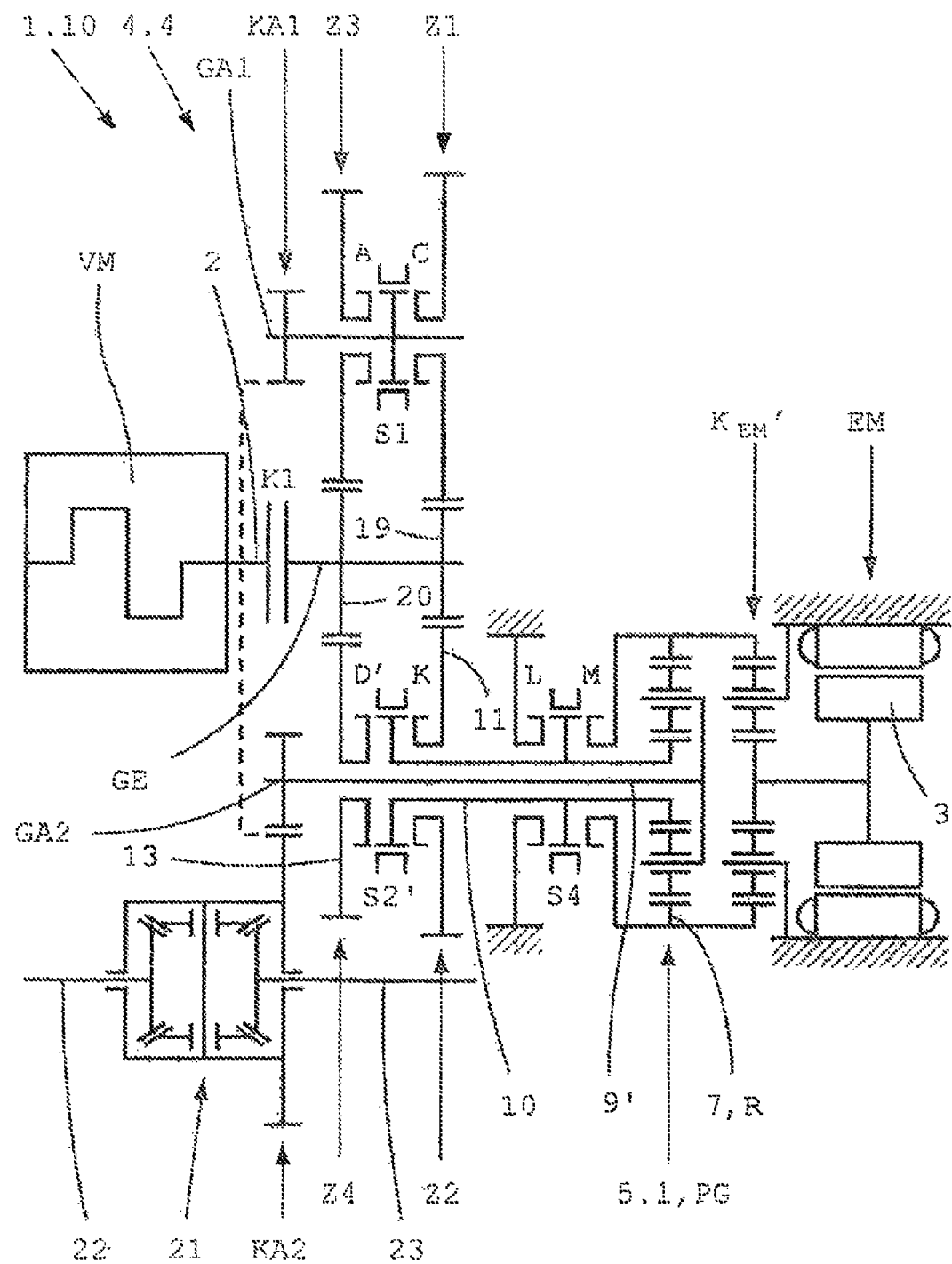
FIG. 10 is a tenth embodiment of a hybrid drive in accordance with the invention, in a schematic presentation.

In the ninth embodiment, schematically shown in FIG. 9, of a hybrid drive 1 constructed with the characteristics of the invention, an alternative arrangement along with an additional linkage in terms of drive technology of the electric machine EM to the phase shifter gearbox 5.1 is illustrated, as an example, on the basis of the hybrid drive 1.4 according to FIG. 4. In contrast to the previously described embodiments of the hybrid drives 1.1-1.8, the electric machine EM is now arranged coaxially at the second output shaft GA2 of the manual transmission 4.4, axially outside next to the phase shifter gearbox 5.1, and the rotor 3 of the electric machine EM is directly connected in a torque-proof manner to the ring gear R of the planetary transmission PG forming the second input element 7 of the phase shifter gearbox 5.1. One consequence of the present arrangement of the electric machine EM is an enlargement of the axial length of the hybrid drive 1.9. In addition, the direct linkage to the second input element 7 of the phase shifter gearbox 5.1 requires that the electric machine EM must be formed in a manner with lower rotation and higher torque, and thus larger and heavier, than with a linkage through a reduction stage $K_{EM}$.

An additional arrangement and linkage in terms of drive technology of the electric machine EM to the phase shifter gearbox 5.1 is realized with a tenth embodiment of a hybrid drive 1.10 constructed in accordance with the characteristics of the invention, which likewise uses, as an example, the manual transmission 4.4 and the phase shifter gearbox 5.1 of the hybrid drive 1.4 in accordance with FIG. 4. With this hybrid drive 1.10, the electric machine EM is also arranged coaxially to the second output shaft GA2 of the manual transmission 4.4, axially outside next to the phase shifter gearbox 5.1, but the rotor 3 of the electric machine EM is now in drive connection to the ring gear R of the planetary transmission PG forming the second input element 7 of the phase shifter gearbox 5.1 through a reduction stage $K_{EM}'$ arranged axially between the phase shifter gearbox 5.1 and the electric machine EM and formed as a planetary transmission stage. Through this linkage in terms of drive technology of the electric machine EM, the electric machine EM can again be formed in a manner with higher rotation and weaker in terms of torque, and smaller and lighter, such that, compared to the direct linkage of the electric machine EM of FIG. 9, a substantial increase in the axial length of the hybrid drive 1.10 does not need to arise.

The hybrid drives 1.1-1.10 shown in FIGS. 1 to 10 show, only by example, preferred combinations of manual transmissions 4.1-4.6, phase shifter gearboxes 5.1, 5.2 and linkages in terms of drive technology of the electric machine EM to the phase shifter gearbox 5.1, 5.2 and through the phase shifter gearbox 5.1, 5.2 to the hollow shaft 10 and the respective output shaft GA; GA2 of the manual transmission 4.1-4.6. Therefore, within the scope of protection of the present patent application, hybrid drives with other versions of manual transmissions and/or of phase shifter gearboxes, and with a different arrangement and linkage in terms of drive technology of the electric machine EM, are also possible.

Thus, for example, the separating clutch K1 on the input side may not be present, such that the drive shaft of the internal combustion engine is firmly connected to the input shaft of the automated manual transmission. Furthermore, the phase shifter gearbox 5.1, 5.2 may be formed as a positive or a negative transmission, or may feature a staged planetary set. It can be further provided that the electric machine EM radially and coaxially surrounds the phase shifter gearbox 5.1, 5.2 and that its rotor is connected in a torque-proof manner to the ring gear of the phase shifter gearbox. It is also possible to provide a separate spur gear stage for one reverse gear in the manual transmission, such that, with a suitable shiftability of the reverse gear step, EDA driving in reverse is also possible. Furthermore, a second electric machine with low power may be present in the hybrid drive formed in accordance with the invention, which is connected to the drive shaft of the internal combustion engine VM, for example, through a belt drive or a spur gear drive, and enables operation as a generator or as a starter motor. In generator mode, such a second electric machine can provide electric power for the electrical system of the vehicle, such as for a serial electromotive drive with the internal combustion at low speeds, particularly upon reverse travel.

Modifications and variations can be made to the embodiments illustrated or described herein without departing from the scope and spirit of the invention as set forth in the appended claims.

REFERENCE SIGNS 1.1-1.10 Hybrid drive
2 Drive shaft of the internal combustion engine VM
3 Rotor of the electric machine EM
4.1-4.6 Manual transmission
5.1, 5.2 Phase shifter gearbox
6 First input element of the phase shifter gearbox 5.1, 5.2
7 Second input element of the phase shifter gearbox 5.1, 5.2
8 Output element of the phase shifter gearbox 5.1, 5.2
9 Free end of the output shaft GA
9' Free end of the second output shaft GA2
10 Hollow shaft
11 Idler gear of the spur gear stage Z2
12 Idler gear of the spur gear stage Z3
13 Idler gear of the spur gear stage Z4
14 Fixed gear of the spur gear stage Z1
15 Fixed gear of the spur gear stage Z2
16 Fixed gear of the spur gear stage Z3
17 Fixed gear of the spur gear stage Z4
18 Fixed gear of the spur gear stage Z5
19 Fixed gear of the spur gear stages Z1 and Z2
20 Fixed gear of the spur gear stages Z3 and Z4
21 Axle differential
22 First drive shaft
23 Second drive shaft
24 Output gear of the reduction stage $K_{EM}$
A-E Gear shift elements of the spur gear stages Z1 to Z5
D' Gear shift element of the spur gear stage Z4
E1, E2 Gear steps of the phase shifter gearbox 5.1, 5.2
FDA Electrodynamic drive system
EM Electric machine
G1-G5 Gears of the manual transmission 4.1-4.6
GA Output shaft of the manual transmission 4.1, 4.2, 4.5
GA1 First output shaft of the manual transmission 4.3, 4.4, 4.6
GA2 Second output shaft of the manual transmission 4.3, 4.4, 4.6
GE Input shaft
K Coupling shift element
$K_{EM}$ Reduction stage of the electric machine EM, spur gear transmission stage
$K_{EM}'$ Reduction stage of the electric machine EM, planetary transmission stage
K1 Separating clutch, friction clutch
KA Output constant of the manual transmission 4.1, 4.2, 4.5
KA1 First output constant of the manual transmission 4.3, 4.4, 4.6
KA2 Second output constant of the manual transmission 4.3, 4.4, 4.6
L, L' Locking shift element
M, M' Bypass shift element
N, O Shift elements of the double shift element S5'
P Planetary gear of the planetary transmission PG
PG Planetary transmission
R Ring gear of the planetary transmission PG
S Sun gear of the planetary transmission PG
S1 Double shift element of the manual transmission 4.1-4.6
S1' Double shift element of the manual transmission 4.5
S2 Double shift element of the manual transmission 4.1, 4.3, 4.6
S2' Double shift element of the manual transmission 4.2, 4.4
S2" Double shift element of the manual transmission 4.5
S3 Single shift element of the manual transmission 4.1, 4.3, 4.6
S3' Double shift element of the manual transmission 4.5, 5.1
S4 Double shift element of the phase shifter gearbox 5.1
S4' Single shift element of the phase shifter gearbox 5.1
S5 Single shift element of the phase shifter gearbox 5.1
S5' Double shift element of the phase shifter gearbox 5.2
T Planetary carrier of the planetary transmission PG
U Shift element of the single shift element S5
VM Internal combustion engine
Z1 Spur gear stage of gear G1
Z2 Spur gear stage of gear G2
Z3 Spur gear stage of gear G3
Z4 Spur gear stage of gear G4
Z5 Spur gear stage of gear G5

The invention claimed is:

1. A hybrid drive (1.1-1.10) for a motor vehicle, comprising:
an internal combustion engine (VM) with a drive shaft (2);
an electric machine (EM) with a rotor (3) operable as a motor and as a generator;
an automated manual transmission (4.1, 4.2, 4.3, 4.4, 4.5, 4.6) carried out in a lay-shaft design with one input shaft (GE) and at least one output shaft (GA; GA1, GA2);
a phase shifter gearbox (5.1, 5.2) carried out in a planetary design with a first input element (6), a second input element (7), and an output element (8);
the input shaft (GE) of the manual transmission (4.1-4.6) connected to or connectable to the drive shaft (2) of the internal combustion engine (VM) through a controllable separating clutch (K1);
the input shaft (GE) able to be brought into drive connection with the output shaft (GA; GA1; GA2) through a plurality of selectively shiftable spur gear sets (Z1, Z2, Z3, Z4, Z5);
the drive shaft (2) of the internal combustion engine (VM) and the rotor (3) of the electric machine (EM) connectable to the output shaft (GA; GA2) of the manual transmission (4.1-4.6) through the phase shifter gearbox (5.1, 5.2);
the phase shifter gearbox (5.1, 5.2) arranged coaxially around a free end (9; 9') of the output shaft (GA; GA2);
the first input element (6) of the phase shifter gearbox (5.1, 5.2) connected in a torque-proof manner to a hollow shaft (10) arranged in a coaxial manner around the output shaft (GA; GA2);
wherein the hollow shaft is:
selectively connectable by a coupling shift element (K) to an idler gear (11, 12) positioned directly axially adjacent one of the spur gear sets (Z2, Z3) for coupling the internal combustion engine; and
connectable in a torque-proof manner to the second input element (7) or
the output element (8) of the phase shifter gearbox (5.1, 5.2) for bypassing the phase shifter gearbox (5.1, 5.2) through a bypass shift element (M, M');
the second input element (7) of the phase shifter gearbox (5.1, 5.2) is connectable to the output element (8) of the phase shifter gearbox (5.1, 5.2) for bypassing the phase shifter gearbox (5.1, 5.2) through the bypass shift element (M, M');

the second input element (7) of the phase shifter gearbox (5.1, 5.2) is permanently in drive connection with the rotor (3) of the electric machine (EM); and the output element (8) of the phase shifter gearbox (5.1, 5.2) is connected in a torque-proof manner to the output shaft (GA; GA2).

2. The hybrid drive according to claim 1, wherein for shifting a first gear step (E1) effective between the rotor (3) of the electric machine (EM) and the output shaft (GA; GA2), the first input element (6) of the phase shifter gearbox (5.1, 5.2) or the hollow shaft (10) is fixed to a housing of the manual transmission through a locking shift element (L, L').

3. The hybrid drive according to claim 1, wherein the electric machine (EM) is arranged coaxially to the output shaft (GA; GA2) of the manual transmission (4.1-4.6), the electric machine being arranged axially outside of and adjacent to the phase shifter gearbox (5.1, 5.2), and the rotor (3) of the electric machine (EM) is directly connected in a torque-proof manner to the second input element (7) of the phase shifter gearbox (5.1, 5.2).

4. The hybrid drive according to claim 1, wherein the electric machine (EM) is arranged coaxially to the output shaft (GA; GA2) of the manual transmission (4.1-4.6), the electric machine being arranged axially outside of and adjacent to the phase shifter gearbox (5.1, 5.2), and the rotor (3) of the electric machine (EM) is in drive connection to the second input element (7) of the phase shifter gearbox (5.1, 5.2) through a reduction stage (KEM') arranged in an axial manner between the phase shifter gearbox (5.1, 5.2) and the electric machine (EM), the reduction stage (KEM') formed as a planetary gear set.

5. The hybrid drive according to claim 1, wherein the electric machine (EM) is arranged in a manner axially parallel to the output shaft (GA; GA2) of the manual transmission (4.1-4.6) radially adjacent to the phase shifter gearbox (5.1, 5.2), and wherein the rotor (3) of the electric machine (EM) is in drive connection with the second input element (7) of the phase shifter gearbox (5.1, 5.2) through a reduction stage (KEM) formed as a spur gear transmission stage.

6. The hybrid drive according to claim 1, wherein the spur gear sets (Z1-Z5) of the manual transmission (4.1-4.6) comprise fixed gears (14-18, 19, 20) arranged at the input shaft (GE) in a torque-proof manner.

7. The hybrid drive according to claim 6, wherein a first gear (G2, G3) of the manual transmission (4.2, 4.4), a first of the spur gear sets of which (Z2, Z3) is arranged directly axially adjacent to the phase shifter gearbox (5.1, 5.2), is shiftable only through the coupling shift element (K) and the bypass shift element (M, M').

8. The hybrid drive according to claim 7, wherein a second gear (G4) of the manual transmission (4.2, 4.4), a second of the spur gear sets (Z4) of which is arranged axially adjacent to the first spur gear stage, is shiftable through the associated gear shift element (D') and the bypass shift element (M, M'), and that the relevant gear shift element (D') is then combined with the coupling shift element (K) into one double shift element (S2').

9. The hybrid drive according to claim 1, wherein the first input element (6), of the phage shifter gearbox (5.1, 5.2) or the hollow shaft (10) are closable in a manner fixed to a housing of the manual transmission through a locking shift element (L, L'), and wherein each of the coupling shift element (K), the bypass shift element (M), and the locking shift element (L) is an unsynchronized claw clutch.

10. The hybrid drive according to claim 1, wherein the bypass shift element (M') is a friction clutch in order to carry out traction shifts as power shifts in an electric driving mode of the hybrid drive.

11. The hybrid drive according to claim 1, wherein the first input element (6) of the phase shifter gearbox (5.1, 5.2) or the hollow shaft (10) are closable in a manner fixed to a housing of the manual transmission through a locking shift element (L, L'), and wherein the bypass shift element (M') and the locking shift element (L') are formed as friction clutches in order to carry out traction shifts and thrust shifts as power shifts in an electric driving mode of the hybrid drive.

12. The hybrid drive according to claim 1, wherein the phase shifter gearbox (5.1) is a simple planetary transmission (PG) with one sun gear (S), one planetary carrier (T) supporting a plurality of planetary gears (P) and one ring gear (R), wherein:

the first input element (6) of the phase shifter gearbox (5.1, 5.2) or the hollow shift (10) are closable in a manner fixed to a housing of the manual transmission through a locking shift element (L, L');

the sun gear (S) forms the first input element (6) connected in a torque-proof manner to the hollow shaft (10);

the planetary carrier (T) forms the output element (8) connected in a torque-proof manner to the output shaft (GA; GA2) of the manual transmission (4.1-4.6); and the ring gear (R) forms the second input element (7) of the phase shifter gearbox (5.1) in drive connection with the rotor (3) of the electric machine (EM).

13. The hybrid drive according to claim 12, wherein the bypass shift element (M, M') and the locking shift element (L, L') are arranged axially behind each other between the coupling shift element (K) and the phase shifter gearbox (5.1).

14. The hybrid drive according to claim 12, wherein the planetary carrier (T) of the phase shifter gearbox (5.1) is selectively connected to the output shaft (GA; GA2) of the manual transmission (4.1-4.6) through a shift element (U).

15. The hybrid drive according to claim 1, wherein the phase shifter gearbox (5.2) is formed as a simple planetary gear set (PG) with one sun gear (S), one planetary carrier (T) supporting a plurality of planetary gears (P), and one ring gear (R), wherein:

the first input element (6) of the phase shifter gearbox (5.1, 5.2) or the hollow shaft (10) are closable in a manner fixed to a housing of the manual transmission through a locking shift element (L, L');

the sun gear (S) forms the second input element (7) in drive connection with the rotor (3) of the electric machine (EM);

the planetary carrier (T) forms the output element (8) connected in a torque-proof manner to the output shaft (GA; GA2) of the manual transmission (4.1-4.6); and the ring gear (R) forms the first input element (6) of the phase shifter gearbox (5.2) connected in a torque-proof manner to the hollow shaft (10).

16. The hybrid drive according to claim 15, wherein the bypass shift element (M') and the locking shift element (L') are arranged radially staggered coaxially next to and above the phase shifter gearbox (5.2).

17. The hybrid drive according to claim 15, wherein the rotor (3) of the electric machine (EM) or an output gear (24) of a reduction stage (KEM) of the electric machine is selectively connectable through a double shift element (S5) to the ring gear (R) or to the sun gear (S) of the phase shifter gearbox (5.2).

18. A method for controlling a hybrid drive (1.1-1.10) that is in accordance with claim 1, wherein in electric driving mode, the internal combustion engine (VM) is previously started, the method comprising following steps:
   a) engagement of a gear shifting clutch (A) of the spur gear set (Z1) of a lowest gear (G1) of the manual transmission (4.1-4.6),
   b) load transfer to the internal combustion engine (VM) by partially closing the separating clutch (K1) and simultaneously reducing load of the electric machine (EM),
   c) load-free opening of one of a locking shift element or the bypass shift element (L, L'; M, M') of a gear (E1; E2) engaged in the phase shifter gearbox (5.1, 5.2),
   d) synchronization of the coupling shift element (K) through a corresponding change in rotational speed of the electric machine (EM) and load-free locking of the coupling shift element (K),
   e) load buildup of the electric machine (EM) and the simultaneous load reduction of the internal combustion engine (VM),
   f) load-free disengagement of the gear shifting clutch (A) of the spur gear set (Z1) of the lowest gear (G1) of the manual transmission (4.1-4.6),
   g) synchronization of the separating clutch (K1) through a corresponding change in rotational speed of the electric machine (EM) and/or the internal combustion engine (VM), and
   h) complete locking of the separating clutch (K1) and transition to EDA (electrodynamic) driving mode.

* * * * *